United States Patent
Chang et al.

(10) Patent No.: US 11,544,025 B1
(45) Date of Patent: Jan. 3, 2023

(54) METHODS FOR USING A PAPER CATALOG MAP WITH A PAPER CATALOG TO MANAGE PAPER TYPES FOR COLOR PRINTING OPERATIONS

(71) Applicant: Kyocera Document Solutions Inc., Osaka (JP)

(72) Inventors: Michael M. Chang, Redondo Beach, CA (US); Mohamed Al Sayed Mostafa, Hawthorne, CA (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 17/470,079

(22) Filed: Sep. 9, 2021

(51) Int. Cl.
  *G06F 3/12* (2006.01)
  *H04N 1/60* (2006.01)
  *H04N 1/00* (2006.01)

(52) U.S. Cl.
  CPC .......... *G06F 3/1257* (2013.01); *G06F 3/1204* (2013.01); *G06F 3/1208* (2013.01); *G06F 3/1219* (2013.01); *G06F 3/1256* (2013.01); *H04N 1/00413* (2013.01); *H04N 1/6094* (2013.01)

(58) Field of Classification Search
  None
  See application file for complete search history.

(56) References Cited

U.S. PATENT DOCUMENTS

| 7,068,380 B2 | 6/2006 | Milton et al. |
| 7,958,157 B2 | 6/2011 | Silverbrook et al. |
| 11,288,555 B1* | 3/2022 | Morales ................ G06F 3/1259 |
| 2003/0117639 A1* | 6/2003 | Milton ................ H04N 1/6097 358/1.9 |
| 2008/0193052 A1* | 8/2008 | Silverbrook ......... G06Q 20/208 382/314 |

\* cited by examiner

*Primary Examiner* — Frantz Bataille
(74) *Attorney, Agent, or Firm* — Millen, White, Zelano & Branigan, P.C.; William Nixon

(57) ABSTRACT

A color printing system includes a printing device and other components that use color printing resources, such as calibration and ICC profiles, to complete color printing operations. These color printing resources are used for a large number of paper types stored in a paper catalog. The paper types can be further placed into paper groups within the paper catalog. The paper groups may be formed by assigning new papers into the paper catalog to those having paper types with existing calibration data and ICC profiles. These relationships are shown in a paper catalog map. The print shop can use the paper catalog map for selling paper types, providing different capabilities for paper types, and other information. The paper catalog map also may be used to select a paper type from a primary paper type and a secondary paper type.

17 Claims, 12 Drawing Sheets

METHODS FOR USING A PAPER CATALOG MAP WITH A PAPER CATALOG TO MANAGE PAPER TYPES FOR COLOR PRINTING OPERATIONS

FIELD OF THE INVENTION

The present invention relates to the use of a paper catalog map with a paper catalog for a printing system. More particularly, the present invention relates to the use of the paper catalog map to improve color printing operations between multiple paper types.

DESCRIPTION OF THE RELATED ART

Some situations can arise where a printer does not have a paper type in its paper catalog. For example, when a customer selects a new paper type that is not currently in a print shop's paper catalog, a conventional approach may involve setting up the printing device to an optimal operating state, gauging the ink limit of the new paper, printing 2,000 patches of CMYK colorant combination, measuring the L*a*b* colorimetric values of the printed patches including paper white and computing the forward and reverse mappings that make up an ICC profile for the paper type. Although the conventional process can create an ICC profile for use with subsequent print jobs, it is time intensive, requires a technician with trained skills, and also relies upon using the printing device for creation of the ICC profile, which results in lost printing production time. Further, some ICC profiles may be used on a limited basis making the process not a worthwhile use of time.

SUMMARY OF THE INVENTION

A method for using a paper catalog for printing operations is disclosed. The method includes defining a plurality of paper groups within a paper catalog map of the paper catalog. A paper group of the plurality of paper groups includes a paper type. The method also includes identifying a plurality of print conditions associated with the paper type. The method also includes determining a first print condition of the plurality of print conditions includes at least one halftone with corresponding calibration data and an ICC profile. The method also includes determining a second print condition of the plurality of print conditions includes at least one halftone without corresponding calibration data or an ICC profile. The method also includes displaying the paper type, the first print condition, and the second print condition in the paper catalog map. The method also includes determining operations needed to generate the calibration data and to create the ICC profile for the second print condition. The method also includes determining a cost and a period of time to generate the calibration data and to create the ICC profile for the second print condition based on the resources.

A method for using a paper catalog for printing operations is disclosed. The method includes defining a plurality of paper groups within a paper catalog map of the paper catalog. A paper group of the plurality of paper groups includes a primary paper type. The method also includes indicating the primary paper type with a first graphical representation within the paper catalog map. The first graphical representation includes color printing resources to color print using the primary paper type. The method also includes determining a secondary paper type within the paper group with a second graphical representation within the paper catalog map that indicates the color printing resources of the primary paper type are used to color print using the secondary paper type. The method also includes receiving a print job for the primary paper type. The method also includes presenting the secondary paper type as a replacement for the primary paper type using the paper catalog map.

A method for using a paper catalog for printing operations at a printing device is disclosed. The method includes defining a plurality of paper groups within a paper catalog map. Each paper group includes a primary paper type within its own graphical representation within the paper catalog map. The method also includes indicating each primary paper type within its respective graphical representation with a measured paper type identification to indicate calibration data and an ICC profile generated using measurements obtained from the primary paper type. The method also includes indicating a secondary paper type along with the primary paper type in the respective paper group with an unmeasured paper type identification to indicate the calibration data and the ICC profile are borrowed from the primary paper type. The method also includes selecting the primary paper type of one of the plurality of paper groups or the secondary paper type of one of the plurality of paper groups for a print job according to a parameter associated with the print job.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
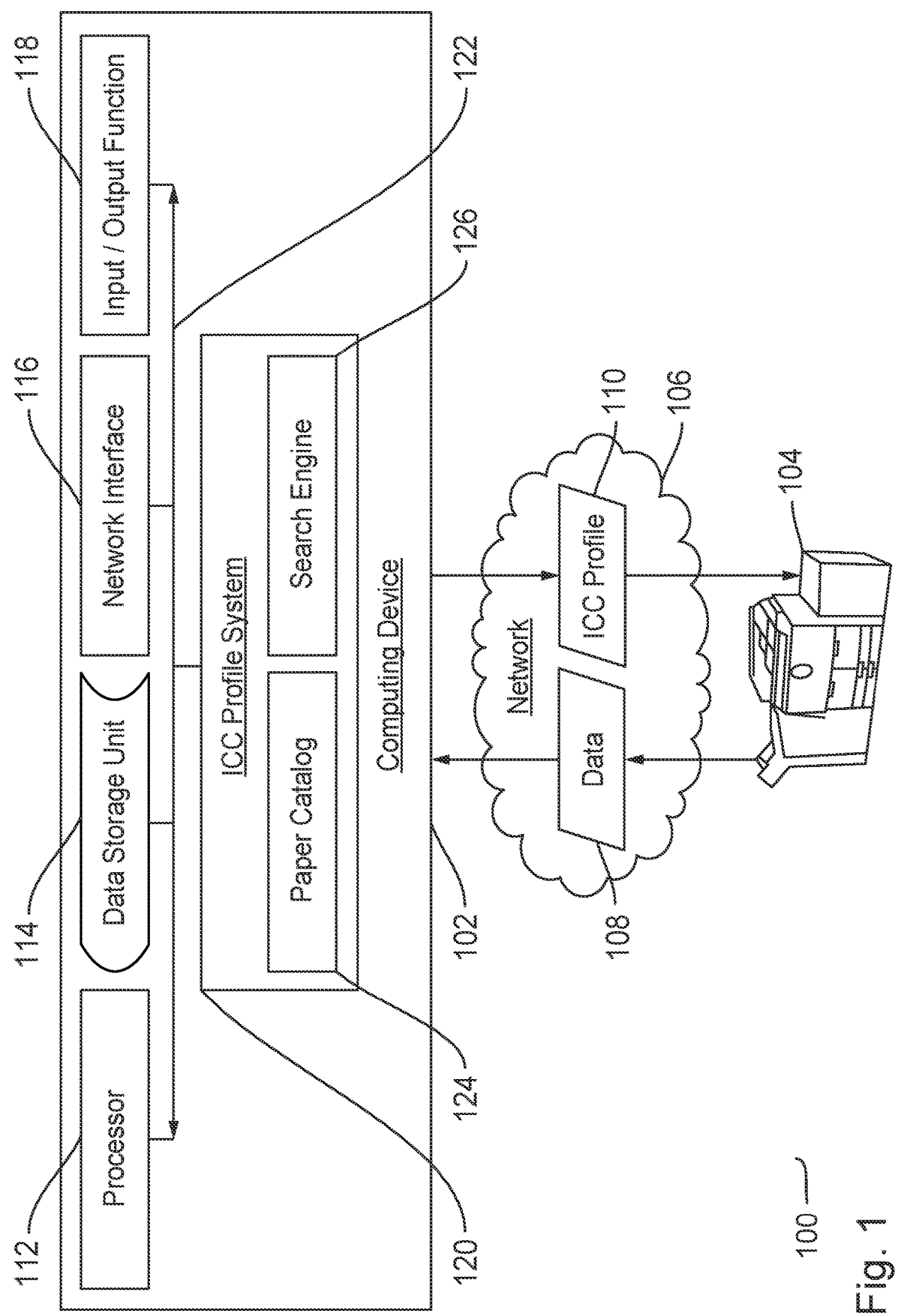
FIG. 1 illustrates a printing system for dynamic sharing of ICC profiles according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Color transformation, also referred to herein as color space conversion or color conversion, involves transforming the representation of a color from one color space to another color space. In some implementations, a device-independent intermediary space is used for the conversion between a source color space and a destination color space. To help simplify and standardize color transformations, the International Color Consortium (ICC) developed a set of standards that is used to create ICC profiles that characterize different color spaces. Under the terminology set by the ICC, color conversion typically involves using a source ICC profile to convert the source color space into a profile connection space (PCS) and using a destination ICC profile to derive the destination color space based on input colors from the PCS. The PCS can use either the CIELAB (L*a*b* color space) or the CIEXYZ color space for color conversions.

Some color transforms are governed by well-defined mathematical equations, such as from a red, green, and blue (RGB) color space to a device-independent color space (e.g., the XYZ color space). Other color transforms lack these mathematical equations and instead utilize one or more look up tables (LUTs), which each convey local empirical correspondences that can be used to map one color space to another. For example, to convert from the L*a*b* color space to the CMYK color space, a three-dimensional look up table (3D-LUT) can be used. In the L*a*b* color space, colors are expressed using three components: a L* component, an a* component, and a b* component. Each of these components is represented by an 8-bit integer, which results in 256 total possible values for each component. A complete 3D-LUT for the color conversion would therefore include 256-by-256-by-256 inputs, and a corresponding 4-byte CMYK output for each input. As such, an ICC profile may include one or more well-defined mathematical equations and/or one or more LUTs for use during color conversion between color spaces.

For color printing, an ICC profile is used as the destination ICC profile within a typical ICC color conversion workflow that enables color conversion from input colors to CMYK ink combinations that the printing device can print. Particularly, the ICC profile is used to convert from PCS device-independent colors (e.g., CIE L*a*b*) to CMYK quantities that the printer can replicate within the printing process. Thus, during the creation of an ICC profile, standard profile maker software tools are configured to identify CMYK ink combinations that are the best matches for the input PCS colors. The CMYK ink combinations identified by the software are then used within one or more 3D-LUTs stored by the ICC profile to enable mapping input L*a* b* quantities from the PCS to output CMYK ink combinations.

The color appearance of printing device inks on different types of papers can differ substantially, which can be attributed to various parameters, such as how the ink interacts with the paper, the exact "white" color of the paper that affects human color visual response, the physical appearance of the paper, and the amount of ink the paper can hold. For example, an uncoated sixty pound paper may have a maximum 225% ink limit while a glossy, gelatin-coated one hundred pound card stock may have a 330% ink limit. Thus, to enable accurate color reproduction under ICC color management, each ICC profile typically factors the specific paper type and printing pipeline combination (e.g., all of the color and image processing, half-toning, and physical setting of the printing mechanism, including inks and colorants used).

For example, a production printing device includes a paper catalog that contains pertinent information of all the paper types that the printer can use. The paper catalog may represent each paper type with a unique identifier (ID) and also express different fields of information for each paper type. The ID may enable a user to understand which paper types have information stored in the paper catalog. Example fields of information may include paper weight (e.g., 65 lb), coating (e.g., matte, glossy, or none), brightness, whiteness, shade, ICC profile, and XYZ white point, among others. Each ICC profile may be made for the paper type and may have a specific white point. The ICC profiles used in production printing may assume viewing in a D50 illuminate, which is a white light used in print shop judgments. In addition, ICC profiles specify forward and reverse mappings in the form of LUTs with contents that are not absolute measurements of L*a*b*. Instead, the contents are adjusted with the assumption that the viewer is chromatically adapted to the paper's white point.

Existing ICC profile maker software typically requires substantial inputs (e.g., measurements from thousands of printed color patches), time, and resources to create an ICC profile that accommodates a print job that involves a new paper type for a particular type of printing device (e.g., a production printer model). For example, generating an ICC profile typically requires using a colorimeter or a spectrophotometer to measure thousands of printed patches to develop the mapping from a color space to the PCS, and from the PCS to the color space. Overall, creating a new ICC profile for a model of printing device is usually a laborious process.

Example embodiments presented herein describe techniques and systems that enable the dynamic sharing of ICC profiles. Particularly, example embodiments can enable printing devices to access existing ICC profiles to complete print jobs on various types of paper, which can save time and resources by avoiding the creation of new ICC profiles using the laborious ICC creation process described above. For example, when a printing device's local paper catalog lacks an ICC profile that is suitable for a customer's print job on a particular paper type being used by a given model of printing device, the printing device (or another computing device) may query the dynamic ICC profile sharing system to check if the sharing system has an ICC profile suitable for completing the print job. In response to the query, the dynamic ICC profile sharing system may scan one or more cloud-based paper catalogs to check if an existing ICC profile is available to accommodate the customer's print job on the model of printer being used. Particularly, the system may perform a search of the paper catalog(s) for an ICC profile that can satisfy the level of precision associated with the customer's print job given the paper type and printing device model being used. The precision requirement may indicate how accurately the print job should reflect the input colors.

In some cases, the dynamic ICC profile system may identify one or more existing ICC profiles while searching the paper catalog that can be used by the particular printer to complete the customer's print job according to expectations (e.g., meet the customer's precision requirement) and subsequently transmit the ICC profile most suitable for the print job to the printing device over a network for use by the printer. Upon receiving the ICC profile, the printing device may complete the print job using the ICC profile received from the dynamic sharing system. In some instances, the printing device may store the ICC profile in local memory for subsequent use. This way, the printing device can access the ICC profile to complete other print jobs when suitable.

In other cases, however, the dynamic sharing system may determine that the paper catalog(s) lack an existing ICC profile that could be used by the particular printing device make and model to complete the customer's print job. Particularly, the search may reveal that no ICC profile is available for the paper type and printing device make and model that satisfies the customer's precision expectation. In such a scenario, the dynamic sharing system may provide an indication to the printing device that no ICC profile exists for the printing device type that can accommodate the customer's print job using the paper type. In some instances, the indication may signal that a new ICC profile may be needed in order to complete the print job using that particular model and make of printing device. As such, the indication can cause the customer to adjust the precision expectation in order to submit another request for an ICC profile that can accommodate the print job with a different precision expectation. For instance, the customer may submit a lower precision expectation after learning that the cloud-based paper catalog(s) lack an existing ICC profile to complete the print job according to the original precision expectation. The dynamic sharing system may perform an additional search of the paper catalog(s) for an ICC profile that the printing device make and model can use on the given paper type and satisfy the customer's lower precision requirement when completing the print job.

As shown, a dynamic ICC profile sharing system can share ICC profiles with various printing devices over network connections, which can ultimately save time and resources when compared to the large amounts of color measurements needed to generate a new ICC profile. The sharing system can facilitate the sharing of ICC profiles between various computing devices and printing devices. Within embodiments, the sharing system may involve transferring ICC profiles between printing devices, servers, computing devices, and various types of memory. The system may store and potentially organize ICC profiles for access by external devices (e.g., printing devices). In some instances, the system may store and organize ICC profiles according to one or more parameters, such as paper type, printing device type (e.g., make and model), color space, and the like.

To further illustrate, a computing device associated with the dynamic ICC profile sharing system may receive data representing a paper type, a customer precision requirement, and supporting parameters and responsively use the data to perform a search of a paper catalog for an existing ICC profile that satisfies the customer precision requirement. The search parameters used during the search of the paper catalog can depend on a level of the customer precision requirement, the printing device make and model, the paper type, or other elements of the print job. In some cases, the computing device may identify an existing ICC profile that can be used by the printing device model, works with the particular paper type, and satisfies the customer precision requirement and subsequently transmit the identified ICC profile to the printer via a network (e.g., the Internet). After receiving the ICC profile, the printing device can complete the print job using the ICC profile. In some instances, the printing device may also store the ICC profile locally in memory at the printer for subsequent access and potential use.

In other cases, the computing device may fail to identify an existing ICC profile that can be used by the printing device model for the paper type and satisfy the customer precision requirement. In such a situation, the computing device may transmit an indication to the printing device (or corresponding computing device) that indicates the paper catalog does not include an existing ICC profile for that printing device model that can complete the printing device job at a precision level that satisfies the customer precision requirement. In response, the customer may choose to adjust the expected precision requirement, which can result in another search for an ICC profile that can be used by the printing device model to complete the print job using the paper type at a precision level that meets the adjusted precision requirement. In some instances, the customer may not adjust the precision requirement, which may require a new ICC profile to be generated by a technician after the dynamic sharing system failed to identify a suitable existing ICC profile. Various other features of the example method discussed above, as well as other methods and systems, are described hereinafter with reference to the accompanying figures.

FIG. 1 depicts a printing system 100 for dynamic sharing of ICC profiles according to the disclosed embodiments. In line with the discussion above, printing system 100 may enable dynamic sharing of ICC profiles for print jobs on various paper types by various types of printing devices (e.g., production printing devices). In the embodiment shown in FIG. 1, printing system 100 includes a computing device 102 in communication with a printing device 104 via a network 106. In other embodiments, printing system 100 may include more or fewer components.

Computing device 102 includes a processor 112, data storage 114, network interface 116, input/output function 118, and an ICC profile system (IPS) 120, all of which may be coupled by a system bus 122 or a similar mechanism. It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Processor 112 may include one or more central processing units (CPUs), such as one or more general purpose processors and/or one or more dedicated processors (e.g., application specific integrated circuits also known as ASICs or digital signal processors also known as DSPs, etc.).

Data storage 114, in turn, may comprise volatile and/or non-volatile data storage and can be integrated in whole or in part with processor 112. Data storage 114 may store program instructions, executable by processor 112, and data that are manipulated by these instructions to carry out the various methods, processes, or functions described herein. Alternatively, these methods, processes, or functions can be defined by hardware, firmware, and/or any combination of hardware, firmware and software. Therefore, data storage 114 may include a tangible, non-transitory computer-readable medium, having stored thereon program instructions that, upon execution by one or more processors, cause computing device 102 to carry out any of the methods, processes, or functions disclosed in this specification or the accompanying drawings. In some embodiments, data storage 114 may be used to store ICC profiles.

Network interface 116 may take the form of a wire line connection, such as an Ethernet, Token Ring, or T-carrier connection. Network interface 116 may alternatively take the form of a wireless connection, such as WiFi, BLUETOOTH®, or a wide-area wireless connection. However, other forms of physical layer connections and other types of standard or proprietary communication protocols may be used over network interface 116. Furthermore, network interface 116 may comprise multiple physical communication interfaces. In addition, network interface 116 may enable computing device 102 and components within computing device 102 to communicate with external sources via network 106.

Input/output function 118 may facilitate user interaction with the computing device 102. Input/output function 118 may comprise multiple types of input devices, such as a keyboard, a mouse, a touch screen (e.g., a graphical user interface (GUI)), a microphone and/or any other device that is capable of receiving input from a user. Similarly, input/output function 118 may comprise multiple types of output devices, such as a display, printer, one or more light emitting diodes (LEDs), speaker, or any other device that is capable of providing output discernible to a user. Additionally or alternatively, example computing device 102 may support remote access from another device, via network interface 116 or via another interface (not shown), such as an RS-132 or Universal Serial Bus (USB) port.

ICC profile system (IPS) 120 represents a system that can perform processes related to ICC profile management, including storage, organization, search, and distribution of ICC profiles. As shown in FIG. 1, IPS 120 includes a paper catalog 124 configured to organize and store existing calibration data and ICC profiles and a search engine 126 configured to search the paper catalog 124 using search parameters that help identify calibration data or a particular ICC profile suitable for a particular print job. Thus, the search parameters used for each search may depend on parameters associated with a print job, such as the paper type, the printing device make and model, the precision expectation for the print job, and other supporting parameters. In some examples, IPS 120 may include multiple paper catalogs used to store existing calibration data and ICC profiles. For instance, one paper catalog may include calibration data and ICC profiles for a first type of printing device and another paper catalog may include ICC profiles for a different type of printing device.

IPS 120 may enable the computing device 102 to receive data from printing devices and responsively search for an existing ICC profile that meets the needs of a particular print job (or an indication that no existing ICC profile is available). To illustrate, FIG. 1 shows printing device 104 transmitting data 108 to computing device 102 via network 106. Upon receiving data 108, search engine 126 may use the data 108 to identify calibration data or a suitable ICC profile from paper catalog 124 that can be used to complete the print job at printing device 104 according to the expectations associated with the print job (e.g., meet the color reproduction precision requirement). As such, data 108 may include, for example, paper type, printing device make and model, customer precision requirement, and supporting parameters. The supporting parameters required for executing an accurate search can depend on the level of the customer's precision requirement. In particular, a higher precision requirement may require more information within data 108 to enable an accurate search for calibration data or a suitable ICC profile.

In some examples, IPS 120 may identify calibration data or a suitable existing ICC profile usable by the printing device 104 and subsequently transmit calibration data or ICC profile 110 to printing device 104. Printing device 104 may then use the calibration data or ICC profile 110 to complete the print job. In other examples, IPS 120 may determine that the paper categorization system lacks the calibration data or a suitable ICC profile that printing device 104 can use for the print job on the paper type according to the expectations provided within data 108. For example, the paper type may be new or the type of printing device may have not had calibration data or an ICC profile generated for the paper type previously. In addition, there might not be calibration data or an ICC profile that satisfies the customer precision requirement associated with the print job for the printing device being used to complete the print job. As such, IPS 120 may indicate that the capture of new calibration data or the production of a new ICC profile may be needed.

As indicated above, the searching process executed by search engine 126 may use different search parameters depending on aspects of the print job. As an example, when the print job has a low precision expectation, search engine 126 may conduct the search of paper catalog 124 without any measurements from color printing of printing device 104. Rather, search engine 126 may use the new paper type's whiteness and shade to act as a CIE XYZ white point substitute, which can be used to search for similar entries in paper catalog 124. Search engine 126 can also use an estimated ink limit derived from the new paper's weight and coating to search for similar entries in paper catalog 124. The search may result in IPS 120 identifying an ICC profile with the paper's white point substitute and assumed ink limit, if one is available.

In another example, IPS 120 may receive an indication within data 108 that the print job has an associated moderate precision expectation. In such a situation, IPS 120 may require additional parameters to identify an ICC profile that can be used to complete the print job according to the moderate precision expectation. As such, IPS 120 may transmit a request for the additional parameters. To comply, printing device 104 can be used to print a small set of heavily inked patches with patches at different total ink percentages. These can be then judged for negative effects, such as paper damage, deformation, and wetness issues. As such, these patches can be measured to capture instances of over-inked saturated paper and also paper white information. The ink judgment percentages and data can be included within data 108 sent to computing device 102, which then can be used by search engine 126 to identify an ICC profile with the paper's white point and approximate ink limit (if one is available) for printing device 104 to use.

In yet another example, IPS 120 may receive an indication within data 108 that the print job has an associated high precision expectation. In such a situation, IPS 120 may request for additional information from printing device 104. Particularly, printing device 104 can be used to print a small set of heavily inked patches (at different total ink percentages) along with primary and secondary colors. This can provide additional information regarding how the color inks interact with the paper type that is being used for the print job. As such, similar to the moderate precision expectation, these patches can be measured using one or more color measurement tools. The ink judgement percentages and measurement data can be then provided to computing device 102, which can be used by search engine 126 to identify an ICC profile within paper catalog 124 with the paper's white point, similar primary and secondary color behavior, and approximate ink limit, if such an ICC profile is available.

Figure 2:
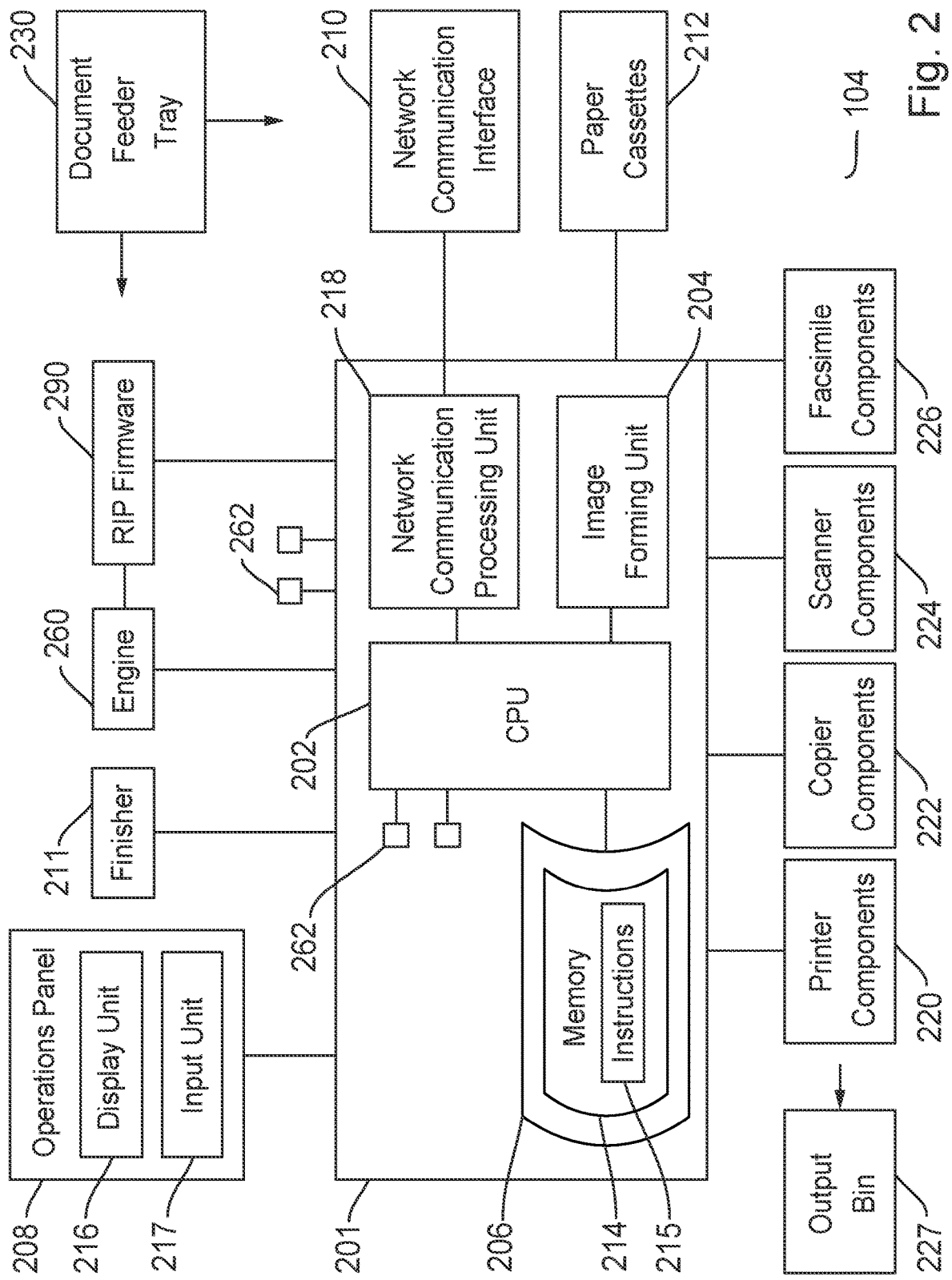
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from computing device 102 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. Sensors 262 also may detect the amount ink used for a printing operation. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with computing device 102 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from computing device 102.

Figure 3A:
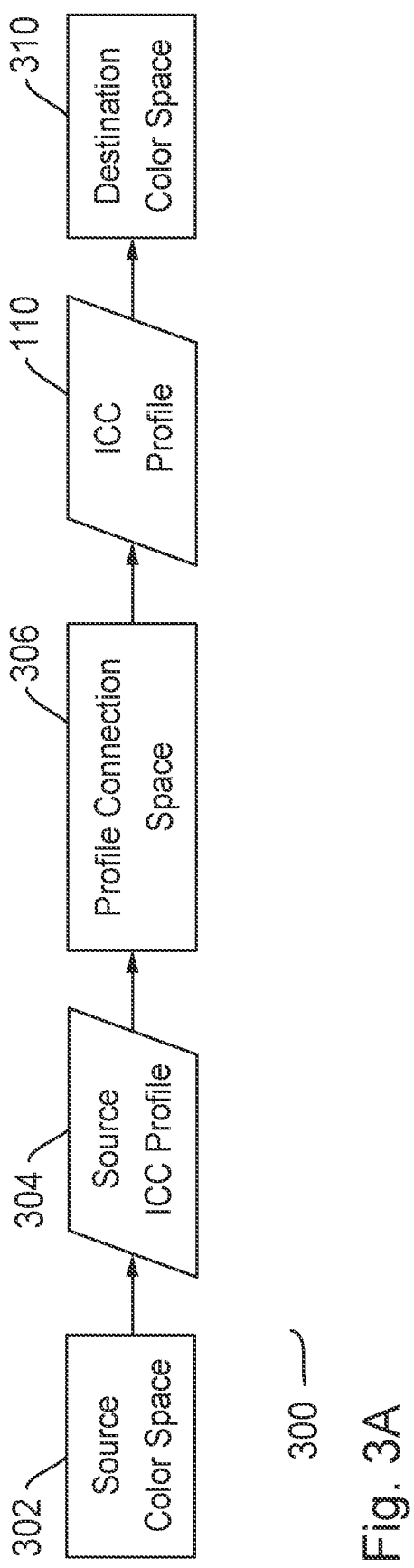
FIG. 3A illustrates a color conversion system according to the disclosed embodiments.

FIG. 3A illustrates a color conversion system 300 according to the disclosed embodiments. System 300 represents a managed color workflow that offers color consistency and predictability during color conversion. As shown in FIG. 3A, system 300 includes a source color space 302, a source ICC profile 304, a profile connection space (PCS) 306, an ICC profile 110, and a destination color space 310.

System 300 may be used for color conversion from a source color space 302 (e.g., colors associated with a print job) to destination color space 310 (e.g., CMYK ink combinations that a particular printer model can print). As such, system 300 may involve initially obtaining the source color space 302, which may represent colors used by a source device (e.g., a computer monitor, a scanner). Some examples of the source color space can include an RGB color space, a CMYK color space, and a CMYKOGV color space.

System 300 further involves identifying a source ICC profile 304 that corresponds to source color space 302. Source ICC profile 304 may provide a mapping for colors within the source color space 302 to PCS 306. For example, source ICC profile 304 may store one or more LUTs that can be used to map source color space 302 to the L*a*b* color space or to the XYZ color space for PCS 306. Alternatively, source ICC profile 304 can include one or more equations for mapping source color space 302 to the L*a*b* color space or to the XYZ color space for PCS 306.

PCS 306 can serve as the interface which provides an unambiguous connection between input profiles (e.g., source ICC profile 304) and output profiles (e.g., destination ICC profile 110) within the system 300. PCS 306 can allow the profile transforms for input, display, and output devices to be decoupled so that they can be produced independently. As such, PCS 306 can serve as the virtual destination for input transforms and the virtual source for output transforms. When the input and output transforms are based on the same PCS definition, even though they are created independently, the input and output transforms can be paired arbitrarily at run time by a color-management module (CMM) and will yield consistent and predictable results when applied to color values.

ICC profile 110 may enable mapping colors from PCS 306 to destination color space 310. In particular, ICC profile 110 may provide a mapping for colors within PCS 306 to destination color space 310. For example, ICC profile 110 may store one or more LUTs that can be used to map input colors from PCS 306 (e.g., L*a*b* color space) to the CMYK color space associated with destination color space 310. Alternatively, ICC profile 110 can include one or more equations for mapping colors from PCS 306 to destination color space 310. In some embodiments, ICC profile 110 depends on the make and model of the printing device performing the print job.

Figure 3B:
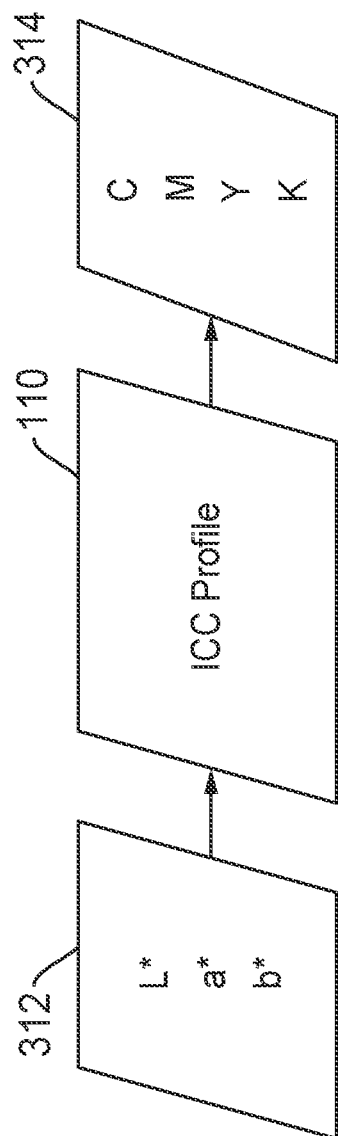
FIG. 3B illustrates an ICC profile according to the disclosed embodiments.

FIG. 3B illustrates inputs and outputs for ICC profile 110 according to the disclosed embodiments. As shown, ICC profile 110 may represent a destination ICC profile configured to enable a particular printer make and model to map input L*a*b* values 312 obtained from PCS 306 shown in FIG. 3A to output CMYK values 314 used to complete the print job. For instance, ICC profile 110 can store one or more LUTs, such as a LUT for mapping colors from the L*a*b* color space to destination color space 310.

Color management, therefore, is an important part of production printing. Printing system 100 should follow a systematic approach to reproduce the colors in the original artwork. The disclosed embodiments help the printed result match the original artwork, even across thousands of printed documents. As such, there are well-defined operating principles for a production printing system, such as printing system 100, to achieve accurate and reliable color reproduction. One key attribute to such principles is how the paper used in the printing operations plays an important part of the color management. This fact is mostly due to the ink-media interaction impacting the color appearance of the output, or printed document. Further, the exact paper white and the finish of the paper both influence the printed colors as seen by an observer.

For each paper type used for a particular model of printing device 104, as a production printing machine, a set of items work together to achieve optimal color reproduction capabilities. For example, printing device 104 usually has one or more halftone designs. Halftone designs are binary on/off dot patterns of each ink to mimic continuously varying transitions. One halftone design may emphasize details in the image, while another one could be best for smooth transitions. In some embodiments, printing device 104 may not be able to print more than 16 shades. Halftone designs allow printing device 104 to expand its color printing capability using the patterns defined therein.

For each halftone, the print shop, or printing system 100, capture the desired per-colorant behavior over all shades of that colorant. Behavior, in this instance, relates to color measurement. The record of these colorant behaviors, and information that allows printing device 104 to be adjusted back to such behaviors, are kept in the calibration data. Colorant behaviors may vary linearly or with a curve. The calibration data relates to characteristics of each ink under the selected halftone, which reliably repeatable.

With a selected halftone, and the calibration data enforced to produce desired behavior of each colorant, printing system 100 may create the ICC profile, as disclosed above, to fully characterize how ink combinations relate to standardized color measurements. Printing device 104 can reproduce the colors of the original artwork using this ICC profile for the specific paper-halftone-calibration set up.

Printing system 100 also may have additional "dials" for more customized controls. For example, there are settings of total ink amounts allowed in the ICC profile for preserving the glossy finish of a paper. Alternatively, another control may be the very conservative expectation of the black ink response set into the calibration data. Other customizations may include an ink-saving mode or vibrant mode for color printing. These specific customizations may be known as print conditions. In the scheme of the aforementioned items impacting color management, the disclosed embodiments may place print conditions at the highest tier under each paper type.

The above discussion relates to the color management items for a single paper type. In a print shop, such as printing system 100, for each model of production printing device 104, there may be dozens or more paper types in use. To keep track of the color management items for all these papers, a paper catalog 124, as disclosed in FIG. 1, may be an important piece of printing system 100. Paper catalog 124 may be a software data storage system that archives all the color management items for each paper type in use. When a print job is specified on a particular paper under a chosen print condition employing one of the halftones, paper catalog 124 will provide the proper corresponding calibration data and ICC profile for printing device 104 or printing system 100 to use.

As the complexity of paper catalogs and their entries increase, the printing software matches this progress. This software progress, however, is only for within the computing and printing devices of printing system 100. In real world use cases, operators within the print shop will frequently need an insight into the many intricate correlations and broad range of possibilities captured in paper catalog 124. For example, such insights may be used for providing quotes to a new print job for a customer or for gauging the logistics and business prospects of selecting certain papers for print jobs. One example of logistics consideration is about the time involved in ICC profile creation. For a new paper, one that will be seldom used and with which the expectation of color matching is non-demanding, printing system 100 may practice the dynamic sharing of ICC profiles with paper catalog 124.

Figure 4:
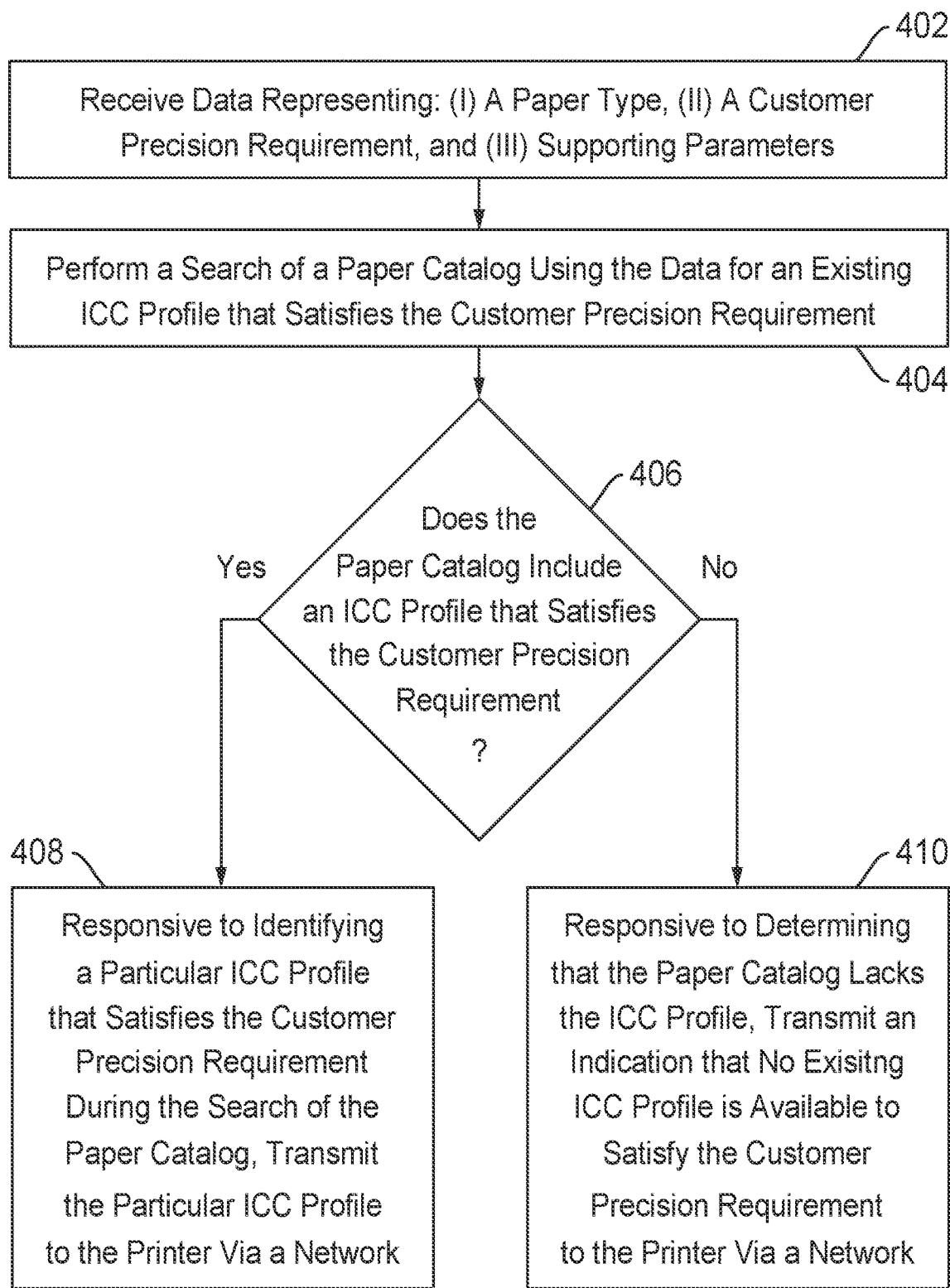
FIG. 4 illustrates a flowchart for dynamic sharing of ICC profiles according to the disclosed embodiments.

FIG. 4 illustrates a flowchart 400 for dynamic sharing of ICC profiles according to the disclosed embodiments. Flowchart 400 may refer to FIGS. 1-3B for illustrative purposes. Flowchart 400, however, is not limited by the disclosed embodiments of FIGS. 1-3B.

Step 402 executes by receiving, at a computing device 102, data representing: (i) a paper type, (ii) a customer precision requirement, and (iii) supporting parameters. For example, the computing device may receive the data from a printing device 104 via a network 106 (e.g., the Internet). In some instances, the computing device may receive an input that requests for an ICC profile to complete a print job using the paper type from an interface corresponding to the printing device. As such, the computing device can also obtain an indication of the printing device type, such as the make and model that will be used to perform the print job.

The supporting parameters obtained by the computing device may depend on the customer precision requirement. In some examples, the supporting parameters may include a small set of color measurements. As such, the computing device may be configured to request for particular supporting parameters responsive to determining the customer precision requirement.

Step 404 executes by receiving the data, performing a search of a paper catalog 124 using the data for an existing ICC profile that satisfies the customer precision requirement. In particular, at least one search parameter used during the search of the paper catalog depends on a level of the customer precision requirement.

In some embodiments, the computing device may determine the level of the customer precision requirement responsive to receiving the data. For instance, the computing device may determine that the customer precision requirement is high, medium, low. In some embodiments, the computing device may use precision thresholds to differentiate from high, medium, and low levels. The computing device may further determine one or more search parameters for use during the search based on the level of the customer precision requirement.

Step 406 executes by determining whether paper catalog 124 includes an ICC profile that satisfies the customer precision requirement. When the computing device determines that the paper catalog includes an ICC profile that can be used by the printer requesting the ICC profile to complete the print job at a level that satisfies the customer precision requirement, flowchart 400 proceeds to step 408. Step 408 executes by, responsive to identifying a particular ICC profile that satisfies the customer precision requirement during the search of the paper catalog, transmitting the particular ICC profile to a printing device 104 via a network 106. The printing device is configured to use the particular ICC profile to complete a print job on the paper type according to the customer precision requirement.

In some embodiments, the computing device may determine the customer precision requirement is below a first precision threshold. For instance, the customer precision requirement may be considered as low when below the first precision threshold. When the customer precision is a low precision expectation, no color printing nor measurements may be required. Rather, performing the search may involve using (i) a XYZ white point substitute determined based on a whiteness and a shade corresponding to the paper type and (ii) an ink limit estimated based on a weight and a coating corresponding to the paper type. In particular, the whiteness, the shade, the weight, and the coating may be supporting parameters. For instance, the computing device may use data representing the new paper type's whiteness and shade to act as the XYZ white point substitute and search for similar entries in paper catalog 124. The new paper type's weight and coating may be used to estimate an ink limit, which the computing device can use to search for similar entries in the paper catalog. In some instances, the computing device may identify, during the search, an ICC profile based on the XYZ white point substitute and ink limit (if one is available) and responsively provide the ICC profile to the printing device.

In some embodiments, the computing device may determine that the customer precision is above the first precision threshold and below a second precision threshold. For instance, the customer precision requirement may be considered as medium when above the first precision threshold and below the second precision threshold. When the customer has a moderate precision expectation (e.g., medium level), the computing device may use different inputs to execute the search for an existing ICC profile that is suitable. This may involve printing a small set of heavily inked patches (at different total ink percentages) using the printing device that is seeking the ICC profile and a user judging the patches for negative effects, such as paper damage, deformation, and wetness issues. For instance, the ink patches may be different shades of greys and blacks. The inked patches can be measured using one or more measuring tools, which can capture instances of over-inked saturated paper. The paper white can also be measured for the new paper type. As such, the computing device may receive the ink judgement percentages and measurement data. For instance, the user may transmit this information to the computing device via one or more interfaces, such as an interface corresponding to the printing device.

By extension, performing the search may be based on the ink judgment percentages and measurement data received at the computing device. As indicated above, the ink judgment percentages and the measurement data are supporting parameters that can be estimated based on measurements on a set of ink patches having high ink amounts. The high ink amounts may cause one or more ink patches from the set of ink patches to include one or more negative effects. The computing device may identify, during the search, an ICC profile that can be used by the printing device based on the ink judgment percentages and measurement data. For example, the computing device may identify an ICC profile with the paper's white point and approximate ink limit that is usable by the printer, if one is available.

In further embodiments, the computing device may determine that the customer precision is above the first precision threshold and the second precision threshold, which may indicate that the customer precision is high. With a higher precision expectation from the customer, the computing device may perform the search for an existing ICC profile differently to accommodate the higher precision. Similar to the moderate level of precision discussed above, the computing device may utilize measurements obtained based on a small set of heavily inked patches. For the higher precision, the printing device seeking the ICC profile (or a matching printer having the same make and model) may print a small set of heavily inked patches (at different total ink percentages) along with primary and secondary colors.

A user may measure these patches and the white of the paper type and subsequently provide the ink judgment percentages and measurement data to the computing device.

As such, based on determining the customer precision requirement is above the first precision threshold and the second precision threshold, the computing device may perform the search of the paper catalog based on ink judgment percentages and measurement data where the ink judgment percentages and measurement data are supporting parameters estimated based on measurements on a set of ink patches having primary and secondary colors. As such, the computing system may identify, during the search, a particular ICC profile based on the ink judgment percentages and measurement data. For example, the particular ICC profile may accommodate the new paper type's white point, primary and secondary color behavior, and approximate ink limit. In some cases, the paper catalog might not include an ICC profile that is suitable for all the parameters described above.

Returning back to step 406, when the computing device determines that the paper catalog lacks an ICC profile that can be used by the requesting printing device to perform the print job at a level that satisfies the customer precision requirement, flowchart 400 proceeds to step 410. Step 410 executes by determining that the paper catalog lacks the ICC profile, transmitting an indication that no existing ICC profile is available to satisfy the customer precision requirement to the printing device via the network. Providing an indication may alert that a new ICC profile may need to be created to complete the print job.

In some examples, flowchart 400 may further involve receiving additional data indicating a second customer precision requirement. In particular, the second customer precision requirement is different from the original customer precision requirement. The customer may adjust the precision expectation in response to learning that an existing ICC profile is not available for the printing device to use to complete the print job according to the original precision expectation. As such, responsive to receiving the additional data, the computing device may perform a second search of the paper catalog using the additional data for an existing ICC profile that satisfies the second customer precision requirement. In some instances, the computing device may transmit the given ICC profile to the printing device via the network responsive to identifying a given ICC profile that satisfies the second customer precision requirement during the second search of the paper catalog. The printing device may be configured to use the given ICC profile to complete the print job on the paper type according to the second customer precision requirement.

Figure 5:
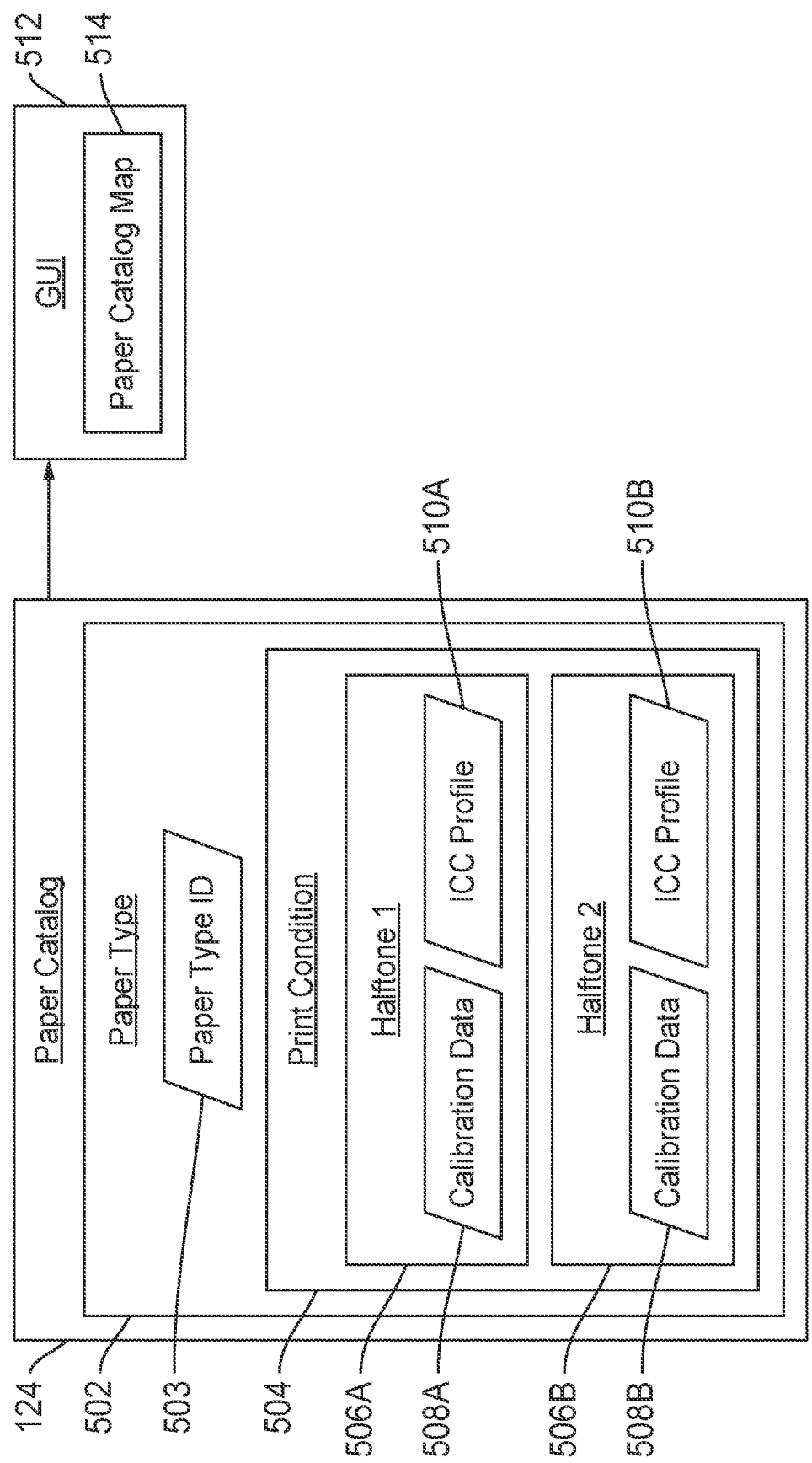
FIG. 5 illustrates a block diagram of a paper catalog map used in the printing system based on the paper catalog according to the disclosed embodiments.

FIG. 5 depicts a block diagram of a paper catalog map 514 for use within printing system 100 based on paper catalog 124 according to the disclosed embodiments. Paper catalog map 514 uses the disclosed processes and systems to relay the information in paper catalog 124 within printing system 100. Via graphical user interface (GUI) 512, paper catalog map 514 provides the operators a clear vision of complex data sets and use the disclosed processes to inform on making operating decisions in a print shop.

For each paper type used for a particular model of printing device 104, there are a set of items that work together to achieve optimal color reproduction capabilities. These items may be represented in paper catalog 124. An example of an entry in paper catalog for a paper type 502 may be shown. Paper catalog may include hundreds or thousands of such entries. Paper type 502 may be identified within paper catalog 124 by paper type identification 503. In some embodiments, paper type identification 503 may be a unique symbol or code that identifies paper type 502 within paper groups, disclosed in greater detail below.

Paper type 502 includes print conditions. Print conditions may be applied to print jobs using paper type 502. Examples of print conditions may be high quality, default, ink saving, and the like. Each print condition may include its own color printing resources, such as calibration data and ICC profiles. Application of a print condition results in a different result for a print job using paper type 502 at printing device 104. For example, a high quality print condition will differ in some fashion as a finished, printed document from one printed using the default print condition.

As shown in FIG. 5, paper type 502 may include print condition 504. It also may include additional print conditions. Print condition 504 may relate to the high quality print condition for printing paper type 502 at printing device 104. Within print condition, halftones, or halftone designs, may be defined. Printing device 104 may have one or more halftones. Halftones are binary on/off dot patterns of each ink to mimic continuously varying transitions. One halftone could emphasize details in the image, while another could be best for smooth transitions. Thus, print condition 502 includes halftone 506A and halftone 506B. For example, halftone 506A may correspond to the halftone design to emphasize details in the image being printed. Halftone 506B may correspond to the halftone design to provide for smooth transitions.

For each halftone, the print shop should capture the desired per-colorant behavior over all shades of that colorant. By behavior, the disclosed embodiments refer to the color measurement. The record of these colorant behaviors, and the information that allows printing device 104 to be adjusted back to such behaviors, are stored as calibration data. These adjustments may vary linearly or with a curve. The calibration data include characteristics of each ink under the halftone selected. Thus, halftone 506A includes calibration data 508A and halftone 506B includes calibration data 508B.

Further, with a selected halftone, and the calibration data enforced to produce desired behavior of each colorant, the disclosed embodiments then create an ICC profile to fully characterize how ink combinations relate to standardized color measurements, as disclosed above. It is via the ICC profile that, for the specific paper-halftone-calibration-data set up, printing device 104 can reproduce the colors of original document. The process for generating an ICC profile is disclosed above. Thus, halftone 506A includes ICC profile 510A and halftone 506B includes ICC profile 510B.

Often printing systems have additional "dials" for more customized controls. For instance, there are settings of total ink amounts allowed in the ICC profile for preserving the glossy finish of a paper. Alternatively, it could be a very conservative expectation of the black ink response set into the calibration data. These more specific customizations may be identified as print conditions. In the scheme of the aforementioned items affecting color management, the disclosed embodiments place print conditions at the highest tier under each paper type, as shown in FIG. 5 by print condition 504.

Paper type 502 along with print condition 504 and halftones 506A and 506B may refer to the color management resources and items for one paper type. In a print shop, for each model of printing device 104, there may be dozens or more paper types in use. To keep track of the color management items for all these papers, paper catalog 124 may be implemented in system 100. As disclosed above, paper catalog 124 may be a software data storage system that archives all the color management items and resources for each paper type in use. When a print job is specified on a particular paper, identified as paper type identification 503, under a chosen print condition 502 employing halftone 506A, paper catalog 124 will provide the proper corresponding calibration data 508A and ICC profile 510A for printing device 104 to use. If the print job specifies print condition 502 employing halftone 506B, then paper catalog 124 will provide calibration data 508B and ICC profile 510B for printing device 104 to use for the print job.

As the complexity of paper catalog 124 and its entries increase, the paper catalog matches this progress. In the print shop, operators may need an insight into the many intricate correlations and broad range of possibilities captured in paper catalog 124. This need may be felt in providing quotes to a new print job for a customer or for gauging the logistics and business prospects of selecting certain papers for the print jobs. One example of logistics consideration relates to the time involved in ICC profile creation, as disclosed above. For a new paper, one that will be seldom used and under which the expectation of color matching is not demanding, the disclosed embodiments could practice the dynamic sharing of ICC profiles within paper catalog 124. This feature is disclosed in greater detail below.

The disclosed embodiments also employ paper catalog map 514 to relays the information in paper catalog 124 within system 100. Via customizable GUI 512, paper catalog map 514 provides clear representation of complex data sets stored within paper catalog 124. Paper catalog map 514 also shows the status of paper types and associated data within paper catalog 124 as well as relationships between sets of data and paper types.

Figure 6A:
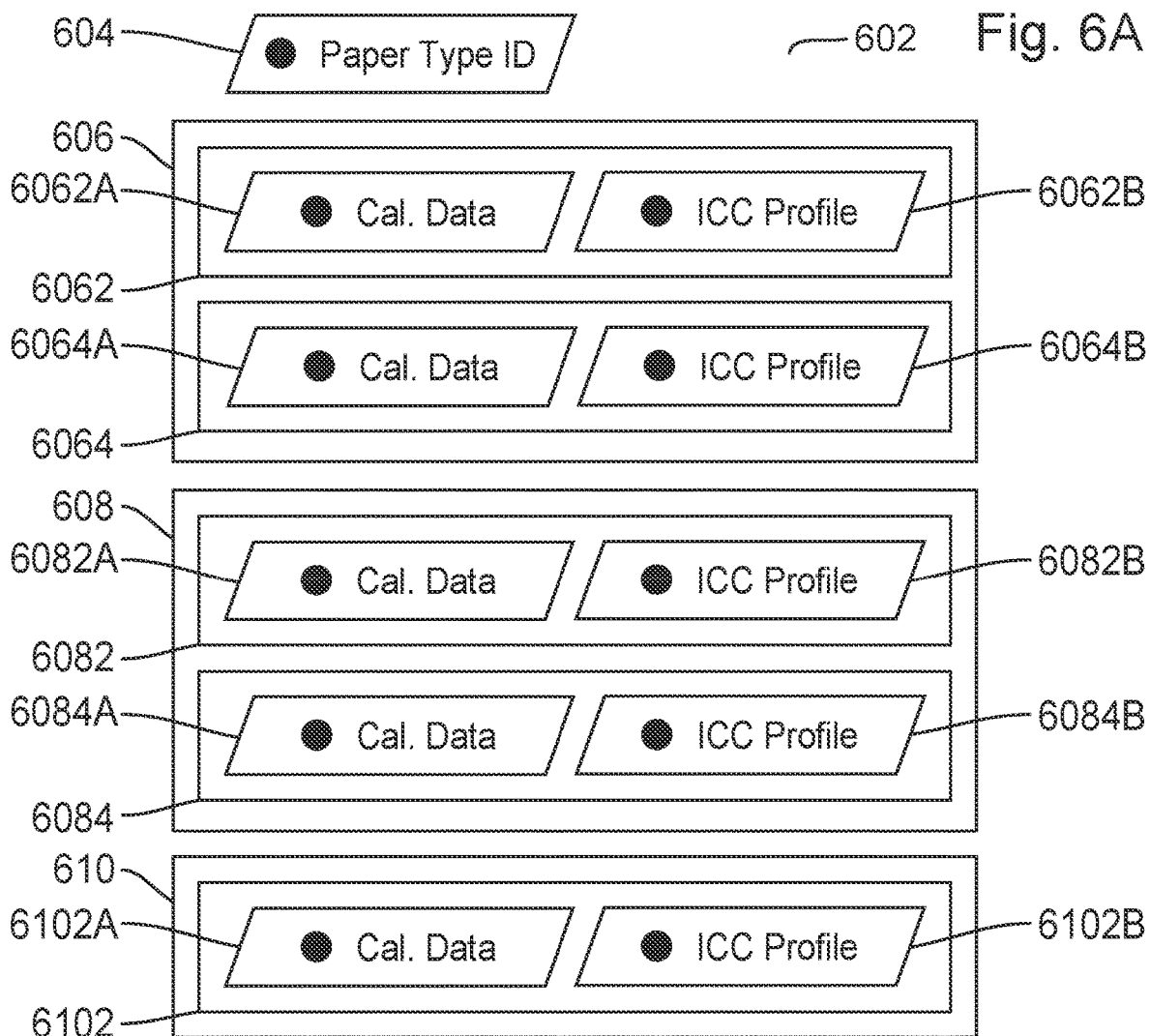
FIG. 6A illustrates an entry within the paper catalog as represented by the paper catalog map in the GUI according to the disclosed embodiments.

FIG. 6A depicts an entry 602 within paper catalog 124 as represented by paper catalog map 514 in GUI 512 according to the disclosed embodiments. Entry 602 may be displayed on GUI 512 as part of paper catalog map 514. What is displayed matches the corresponding entry in the paper catalog. The paper type within paper catalog 124 may be represented by paper type identification 604. This paper type has three print conditions 606, 608, and 610. For example, print condition 606 may be a default print condition, print condition 608 may be a high quality print condition, and print condition 610 may be a vibrant mode print condition.

Print condition 606 and print condition 608 work with both halftones, one for emphasizing detail and one for smooth transitions. Thus, print condition 606 includes halftone 6062 and halftone 6064. Print condition 608 includes halftone 6082 and halftone 6084. Print condition 610 includes one halftone, or halftone 6102. For example, print condition 610 may only work with the "smooth transition" halftone. It may not include a halftone for emphasizing detail in the image.

For each halftone in each print condition, calibration data was collected and an ICC profile generated. All measurements and operations have been performed to capture the color management resources and items for these print conditions. Symbols or graphics for this features will be filled, as shown in FIG. 6 by an "X." Thus, halftone 6062 includes calibration data symbol 6062A for the calibration data within paper catalog 124 for print condition 606. Halftone 6062 also includes ICC profile data symbol 6062B for the ICC profile within paper catalog 124 for print condition 606. As all symbols are filled for illustrative purposes, this means that the calibration data and ICC profiles for print condition 606 are available to be provided by paper catalog 124 to printing device 104.

For print condition 608, halftone 6082 includes calibration data symbol 6082A for the calibration data and ICC profile symbol 6082B for the ICC profile within paper catalog 124. Halftone 6084 of print condition 608 includes calibration data symbol 6084A and ICC profile symbol 6084B for the ICC profile within paper catalog 124 for print condition 608. For print condition 610, halftone 6102 includes calibration data symbol 6102A for the calibration data and ICC profile symbol 6102B for the ICC profile within paper catalog 124. As all symbols are filled for illustrative purposes, this means that the calibration data and ICC profiles for print conditions 608 and 610 are available to be provided by paper catalog 124 to printing device 104.

As all print conditions 606, 608, and 610 are filled with regard to its color management resources and items of calibration data and ICC profiles, paper type identification 604 also may be filled with a graphic. This indication by the graphic communicates that the paper type associated with paper type identification 604 may be the basis of a paper group having different paper types that have shared relationships, as disclosed below.

Figure 6B:
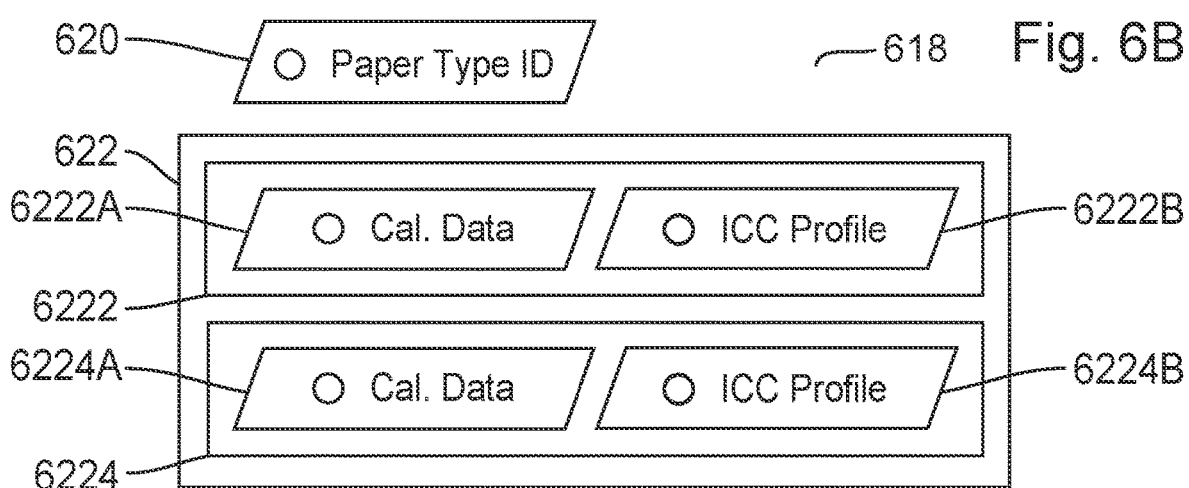
FIG. 6B illustrates a new entry for a paper type having a paper type identification to the paper catalog as represented by the paper catalog map in the GUI according to the disclosed embodiments.

FIG. 6B depicts a new entry 618 for a paper type having paper type identification 620 to paper catalog 124 according to the disclosed embodiments. A customer may order a print job for the paper type with a default print condition using both halftones. As shown in paper catalog map 514, new entry 618 is not within paper catalog 124. The print job calls for print condition 622 having halftone 6222 and halftone 6224. Missing from the halftones are the data needed for calibration data and the ICC profiles. Thus, calibration data symbol 6222A and ICC profile symbol 6222B for halftone 6222 are not marked as filled. Calibration data symbol 6224A and ICC profile symbol 6224B for halftone 6224 also are not marked as filled.

Within paper catalog 514, paper type identification 620 may include a graphic that all symbols do not have a solid fill, or that data still needs to be captured to perform color printing using the paper type. The print shop does not have the paper type in paper catalog 124. Thus, they may perform all the operations and processing necessary to obtain the data to generate calibration data and ICC profiles for the print condition. The customer, however, is a non-demanding customer with a small job, so it is not worth the time and effort to set up calibration and generate ICC profiles for new entry 618. In another example, the customer wants to use glossy paper and to save ink in order to lower costs, but wants the order done tomorrow with 50,000 sheets.

In both examples for new entry 618, the print shop cannot tell the customer that no calibration data or ICC profile is available. Further, it may not make economic sense to capture these items for color printing for a small job from a non-demanding customer or the print shop may not have the resources or time available to do so. When a print shop makes calibration data and ICC profiles for a paper, it is time-consuming and tedious technical work. In these instances, the print shop may use existing resources available for other papers for new entry 618. All calibration data and ICC profiles made for the various papers in paper catalog 124 may be considered valuable color printing resources, as well as properties, of the print shop of system 100.

As disclosed above, paper catalog 124 is a database usually accessed by system 100 for storage and retrieval of calibration data and ICC profiles during printing operations, such as raster image processing and color conversion. In some embodiments, there may be a paper catalog for each model of printing device 104, as a production printing device, in system 100. When there are thousands of different papers in the production printing industry, the print shop of system 100 cannot feasibly capture and generate all calibration data sets and ICC profiles.

Thus, the disclosed embodiments work with paper groups within paper catalog 124 to dynamically share these resources to papers within the paper groups. For each primary paper, such as shown in entry 602, with which the print shop has generated calibration data and ICC profiles, the disclosed embodiments dynamically share color printing resources with other papers, such as new entry 618, that have similar attributes or color characteristics to the primary paper, or entry 602. During raster image processing, system 100 will automatically retrieve the calibration data and the ICC profiles required, whether these are from a primary paper itself or, for a member of the paper group, dynamically shared from the primary paper.

Figure 7:
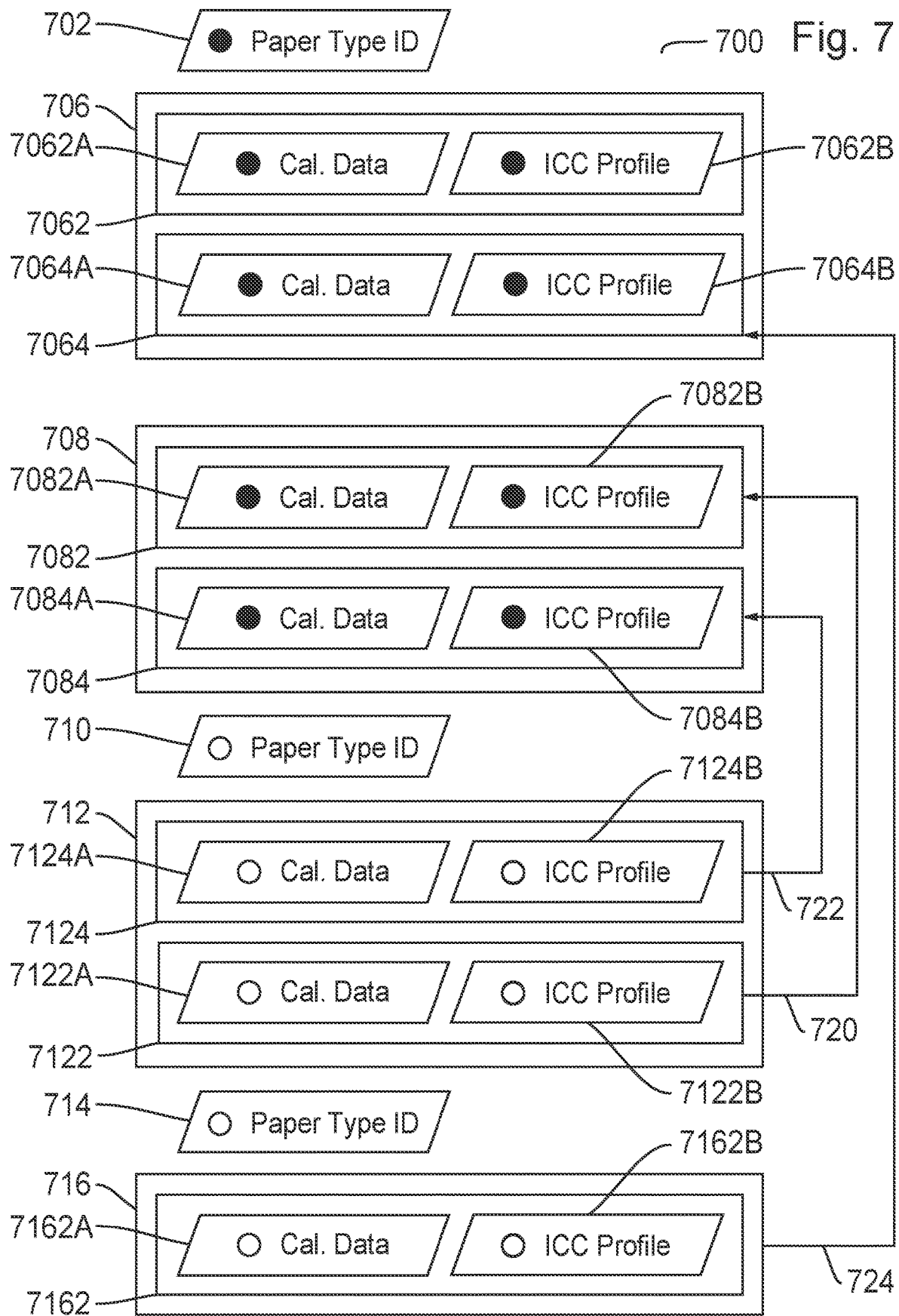
FIG. 7 illustrates a block diagram of a paper group having multiple paper types according to the disclosed embodiments.

FIG. 7 depicts a block diagram of a paper group 700 having multiple paper types according to the disclosed embodiments. Paper group 700 includes three paper types shown by paper type identifications 702, 710, and 714. Paper type identification 702 may correspond to a primary paper type within paper group 700 as a graphic indicates that all calibration data and ICC profiles are available for the print conditions and respective halftones for the paper type. No further operations need to be done with regard to color printing management. The paper type of paper type identification 702 can provide calibration data and ICC profiles to printing device 104 as needed. Within paper catalog map 514, the calibration data and ICC profiles, as well as the graphic, may have solid fills. This paper also may be known as the basis for paper group 700.

The paper type of paper type identification 710 and the paper type of paper type identification 714 may be added to paper group 700. They may be known as secondary paper types as the information needed for color printing is not readily available. The disclosed embodiments may use dynamic paper catalog resource assignment to provide calibration data and ICC profiles for use with these paper types. These features are disclosed in greater detail below.

The primary paper type of paper group 700, or paper identification type 702, may include print conditions 706 and 708. Print condition 706 includes halftones 7062 and 7064. Each halftone includes color printing resources for color printing on the paper type under the print condition. Thus, halftone 7062 includes calibration data 7062A and ICC profile 7062B. Halftone 7064 includes calibration data 7064A and ICC profile 7064B. Print condition 708 includes halftones 7082 and 7084. Halftone 7082 includes calibration data 7082A and ICC profile 7082B. Halftone 7084 includes calibration data 7084A and ICC profile 7084B. Data and profiles for these printing modes have been captured and generated. No further operations should be needed to use paper type identification 702.

Upon a specification review and printed test chart measurements, the disclosed embodiments determine that new paper identification type 710 can borrow calibration data and ICC profiles from print condition 708 of paper identification type 702. Paper identification type 710 may be a secondary paper type in that all the calibration data and ICC profiles needed to perform color printing operations are not readily available within paper catalog 124. Print condition 708 may be the default condition for paper identification type 702. Approximate color matching may determine that condition 712 of paper identification type 710 will provide similar color printing results using calibration data 7082A and 7084A and ICC profiles 7082B and 7084B of print condition 708.

Connections 720 and 722 may illustrate these relationships. According to the disclosed embodiments, if paper type identification 710 is selected for a print job and print condition 712 is applied, then, depending on the appropriate halftone, calibration data and the ICC profile may be "borrowed" or dynamically shared from print condition 708. Thus, for halftone 7122, calibration data 7122A may use calibration data 7082A and ICC profile 7122B may use ICC profile 7122B. For halftone 7124, calibration data 7124A may use calibration data 7084A and ICC profile 7124B may use ICC profile 7084B. As the resources are not available in paper catalog 124 for calibration data 7122A and 7124A and ICC profiles 7122B and 7124B, these items are not filled in paper catalog map 514. Connections 720 and 722 show that the resources are borrowed from filled items within paper group 700.

Another customer may request paper type identification 714 for use on printing device 104. The print job may be small and requests print condition 716, which is a default print condition, with halftone 7162, which may be a sharp halftone. As with paper identification type 710, paper type identification 714 does not have readily available calibration data and ICC profiles. The disclosed embodiments may determine through quick checks to determine that calibration data and an ICC profile from paper type identification 702 may be shared. The same color may be shown when the ink is placed on the paper type as with the primary paper type. Specifically, halftone 7064 of print condition 706 may provide similar color printing results as desired for halftone 716. Connection 724 illustrates this relationship in paper catalog map 700.

Paper catalog 124 may designate paper identification type 714 as being used with halftone sharp in the default print condition. Halftone 7162 borrows color printing resources from halftone 7064. Thus, calibration data 7162A may use calibration 7064A and ICC profile 7162B may use ICC profile 7064B. Paper identification type 714, therefore, also may be a secondary paper type within paper catalog 124 and designated as such by being unfilled according to graphic 713. Paper identification type 710 also may be designed as a secondary paper type by a graphic being unfilled. The color resources needed to use these papers may be borrowed from the primary paper type of paper group 700.

Figure 8:
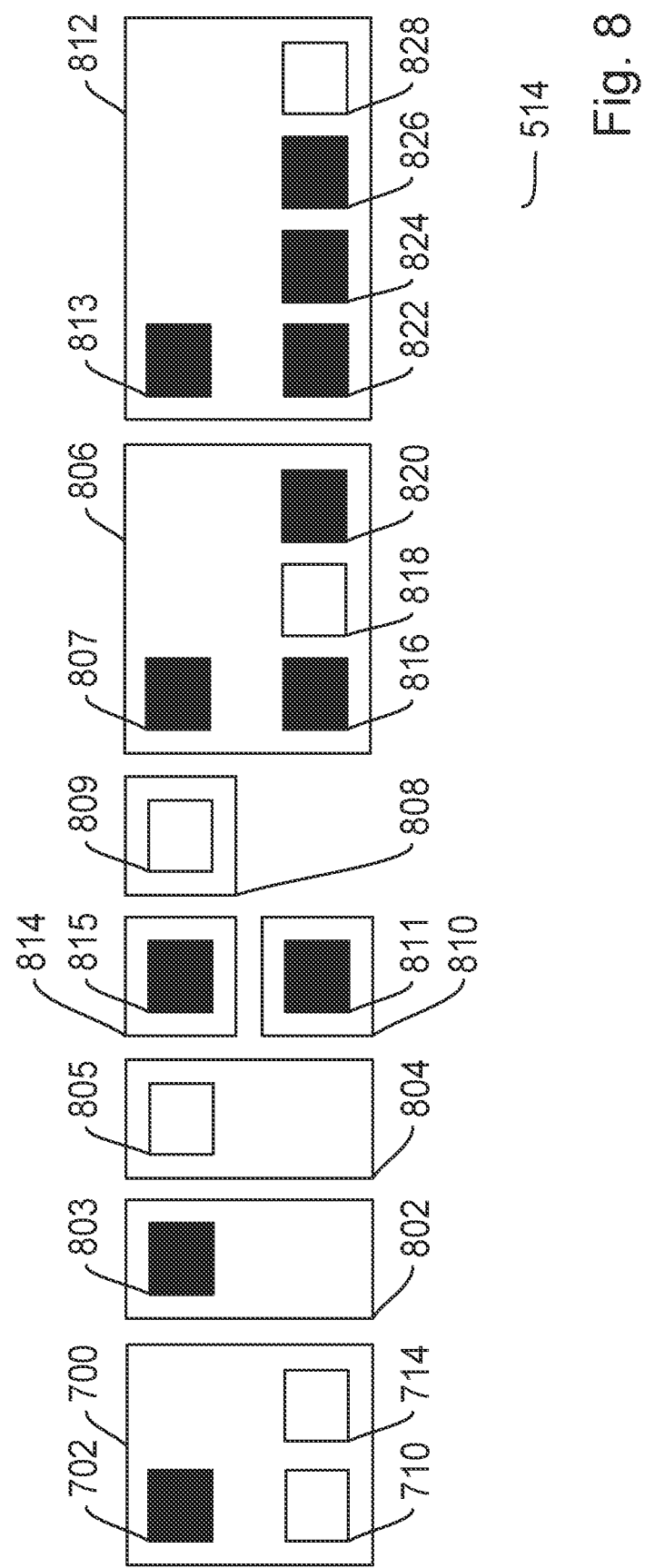
FIG. 8 illustrates a block diagram of the paper catalog map with a plurality of paper groups according to the disclosed embodiments.

FIG. 8 depicts a block diagram of paper catalog map 514 with a plurality of paper groups according to the disclosed embodiments. Paper catalog map 514 provide a color data inventory for system 100. The print shop may determine how many paper types have been worked on to set up calibration data and ICC profiles for specific halftones and print conditions. In other words, paper catalog map 514 may show which paper groups and paper types have primary papers, or measured papers, with "filled" calibration data and ICC profiles provided by measured and captured data. Further, paper catalog map 514 may show those paper groups or paper types that need data or further operations to provide the calibration data and ICC profiles to provide measured papers.

Using paper catalog map 514, the print shop of system 100 should have a real sense of the inventory of higher quality color resources, such as calibration data and ICC profiles that were custom-made for a select subset of papers. This select subset may be referred to as measured papers or primary paper types. Paper catalog map 514 can highlight and present the actual papers in this select subset, possibly at a significantly smaller number than the overall number of paper types in paper catalog 124. For example, paper catalog 124 may include 1200 paper types but only 25 measured paper types.

This information may be shown visually using paper catalog map 514 for use in the print shop. It also may be applicable in time budgeting for future expansion of the subset of measured papers or primary paper types. It also may provide an awareness of the availability of higher quality offerings to customers. If a measured paper is within a paper group having a paper type requested by the customer, then the measured paper may be recommended as providing better color printing capabilities. The print shop may promote the measured papers.

Thus, paper group 700, disclosed above, may be shown with paper type identification 702 being the primary paper type, or measured paper, for the paper group. Paper type identification 702 is shown as filled or, as disclosed in FIG. 7, color printing resources are available for the calibration data and ICC profiles for print conditions of the paper type. Paper type identifications 710 and 714 are not filled, as disclosed above, and may borrow calibration data and ICC profiles for use during color printing operations using these paper types. Paper type identifications 710 and 714 may refer to secondary papers or secondary paper types within paper group 700, and are not measured papers. In reviewing paper catalog 514, it may be determined that calibration data is needed for paper type identifications 710 and 714 and additional operations performed to generate applicable ICC profiles. No such operations are needed for the primary paper in paper group 700.

Paper group 802 may include a primary paper, shown as paper type identification 803. Paper catalog map 514 may show paper type identification 803 as filled. Further, paper group 802 may not include any secondary papers. Thus, no further operations may be needed for paper group 802 according to paper catalog map 514. In contrast, paper group 804 includes paper type identification 805, which is not indicated as being filled. Paper group 804 may not include a primary paper having all its calibration data and ICC profiles measured and generated for color printing on printing device 104. Thus, paper catalog map 514 indicates that these processes should be undertaken to have a primary paper type for paper group 804.

Paper group 806 includes a primary paper being filled as paper type identification 807. Paper group 806 also may include secondary paper types, shown as paper type identifications 816, 818, and 820. Of these, paper type identifications 816 and 820 are "filled" in that the calibration data and ICC profiles are generated and available, without borrowing resources from the primary paper type in paper group 806. Paper type identifications 807, 816, and 820 may be known as measured papers, as disclosed above. Paper type identification 818, however, is not filled such that calibration data and ICC profiles have not been generated for this specific paper type. Paper catalog map 514 may indicate that paper type identification 818 needs further processing and operations performed.

Paper groups 808 and 810 are shown. Their relative size within paper catalog map 514 indicates that only one halftone is available for the print conditions applicable for the paper types. Paper group 808 includes paper type identification 809, which is not filled. Thus, the calibration data and ICC profile for the halftone of the print condition for paper type identification 809 are not generated. In contrast, paper type identification 811 of paper group 810 is filled such that further calibration data or ICC profile operations are not needed according to paper catalog map 514.

Paper groups 812 and 814 also may include print conditions having a single halftone. Paper group 812 includes a primary paper type, shown as paper type identification 813. Paper catalog map 514 shows paper type identification 813 as "filled," or a measured paper, in that calibration data and ICC profile for the halftone is captured and readily available to be sent to printing device 104. Paper group 812 also includes secondary paper types, shown as paper type identifications 822, 824, 826, and 828. Paper catalog map 514 may show paper type identifications 822, 824, and 826 as being filled, or measured papers. Paper type identification 828 is shown as not filled so that calibration data may be captured and the ICC profile generated. Paper type 815 includes a primary paper type, shown as paper type identification 815. Paper catalog map 514 shows paper type identification 815 as being filled.

Using paper catalog map 514, the print shop may determine visually and quickly those paper groups that need a primary paper for use in later operations when new paper types are assigned to paper catalog 124. For example, in prioritizing calibration data capture and ICC profile generation, the print shop may determine these operations happen for paper identification types 805 and 809 to provide a primary paper type for paper groups 804 and 808, respectively. It may be more important to have primary paper types available for these paper groups than those paper types shown as secondary paper types, such as paper type identifications 710, 714, 818, and 828. The secondary paper types may borrow resources within their paper groups.

Figure 9:
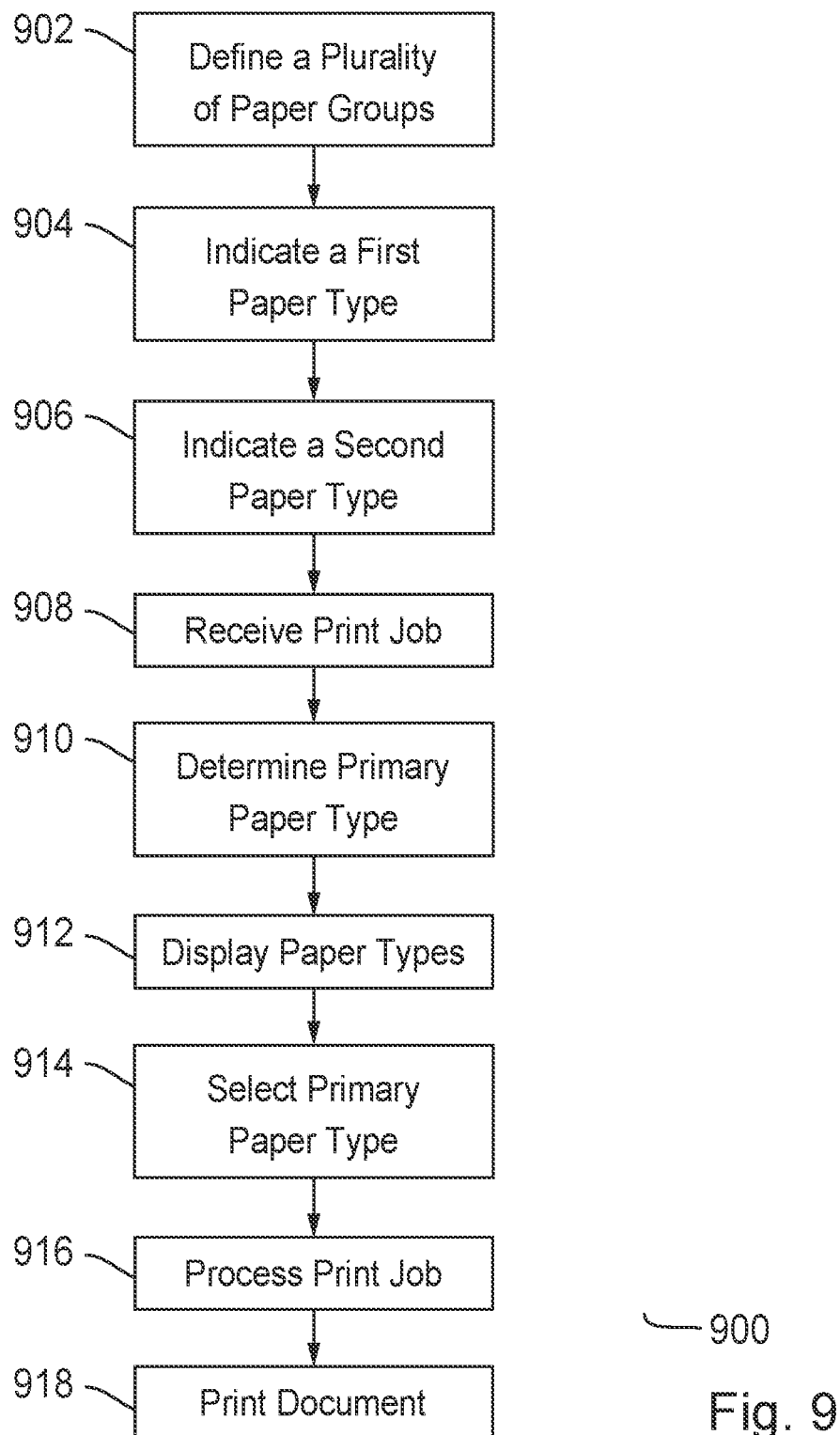
FIG. 9 illustrates a flowchart for using the paper catalog map of the paper catalog for printing operations according to the disclosed embodiments.

FIG. 9 depicts a flowchart 900 for using paper catalog map 514 of paper catalog 124 for printing operations according to the disclosed embodiments. Flowchart 900 may refer to features of FIGS. 1-8 for illustrative purposes. Flowchart 900, however, is not limited to the features disclosed by FIGS. 1-8.

When a customer demands top color accuracy in a print job asks about paper choices, the print shop may only present measured papers, or primary paper types as disclosed by paper catalog map 514. These papers are the ones in the select subset in paper catalog 124 with actual custom-made color resources, such as the calibration data and ICC profiles. Paper catalog map 514 may serve as a business negotiation aid in real time or face-to-face exchanges with the customer to suggest the best possible paper for the print job. The print shop may not want to recommend secondary paper types or those that borrow resources according to paper catalog map 514.

Step 902 executes by defining a plurality of paper groups within paper catalog map 514 of paper catalog 124. A plurality of paper groups may be shown in FIG. 8, which includes paper groups 700, 802, 804, 806, 808, 810, 812, and 814. Each paper group should have at least one paper type, shown as a paper type identification in the paper groups. Step 904 executes by indicating a first paper type within a paper group of the plurality of paper groups. Referring to FIGS. 7 and 8, paper group 700 may include a first paper type shown as paper type identification 702.

Step 906 executes by indicating a second paper type within the paper group. Within paper group 700, a second paper type may be shown as paper type identification 710. Both paper types use color printing resources for color printing operations. In other words, as shown above, paper type identifications 702 and 710 use calibration data and ICC profiles to perform color printing operations according to print conditions having halftones.

Step 908 executes by receiving a print job using the color printing operations at printing device 104, or within system 100. The print job would like to print a document on a certain quality or type of paper having a print condition. As such, the disclosed embodiments may determine that the print job may be fulfilled according a paper group within paper catalog 124. Step 910 executes by determining a primary paper type, or measured paper, within the paper group from the indicated paper types. Referring to paper group 700, paper type identification 702, as the first paper type, is shown as being a measured paper based on the graphic being "filled" in paper catalog map 514. Paper catalog 124 also may tag paper type identification 702 is a measured paper for paper group 700. Paper type identification 710, as the second paper type, is considered a secondary paper type in paper catalog 124. Paper catalog map 514 also shows connections 720 and 722 that paper type identification 710 borrows color printing resources, in the forms of calibration data and ICC profiles, from the primary paper type, or paper type identification 702.

Step 912 executes by displaying the paper types for the paper group in paper catalog map 514. The first paper type, or paper type identification 702, may be shown as the primary paper type or the measured paper available in paper group 700. The second paper type, or paper type identification 710, may be shown as the secondary paper type borrowing color printing resources from another paper type within paper group 700. Step 914 executes by selecting the first paper type to complete the color printing operation for the print job at printing device 104. In other words, paper type identification 702 is recommended and selected to complete the color printing of the print job. Paper type identification 710 is not considered.

Step 916 executes by processing the print job using the color printing resources from paper catalog 124 for the primary paper type. Thus, depending on the applicable condition and halftone, printing device 104 receives and applies the calibration data and the ICC profile to perform color printing using the selected paper type. Step 918 executes by printing the document of the print job having the applicable images or text in color.

Figure 10:
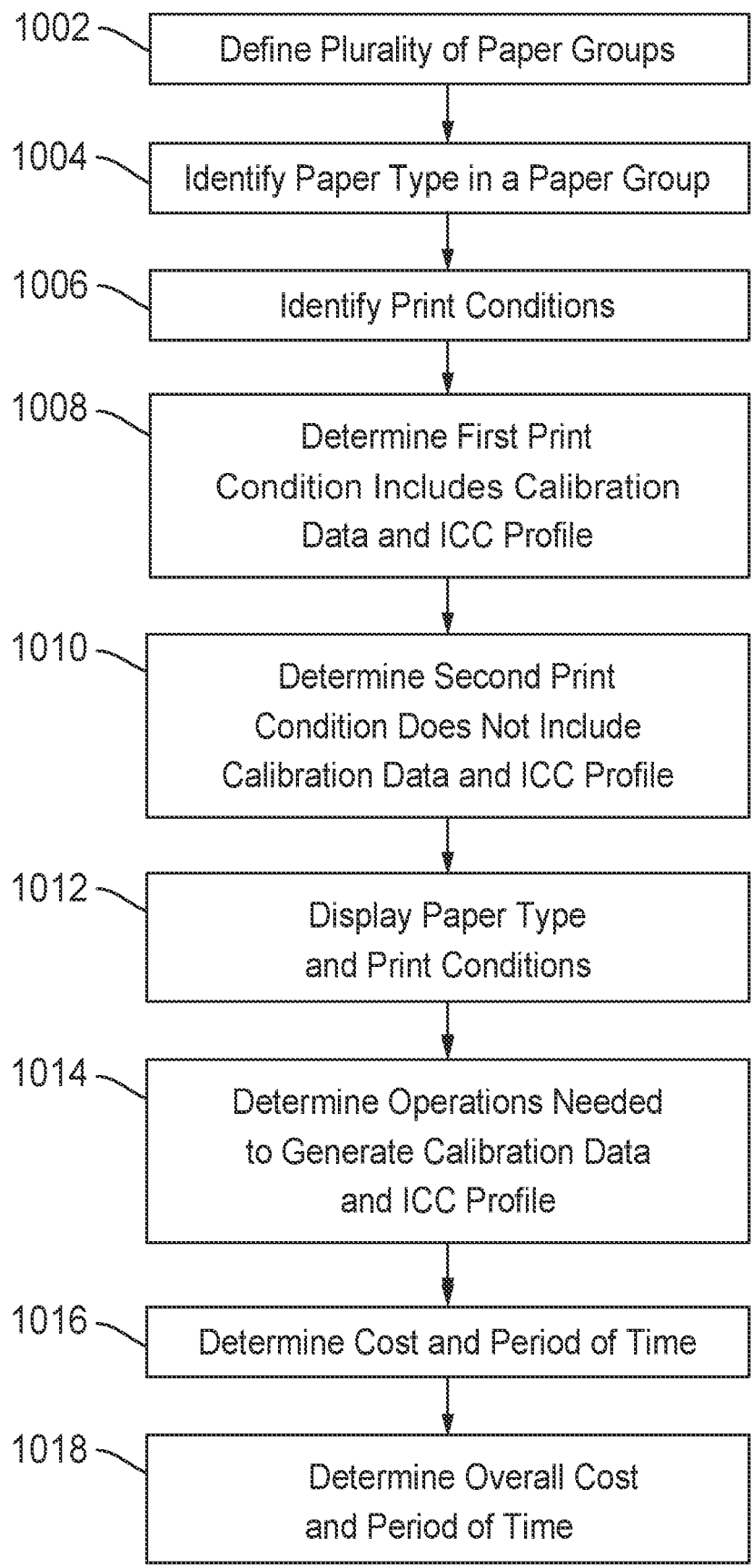
FIG. 10 illustrates a flowchart for using the paper catalog map of the paper catalog to provide information regarding color printing according to the disclosed embodiments.

FIG. 10 depicts a flowchart 1000 for using paper catalog map 514 of paper catalog 124 to provide information regarding color printing according to the disclosed embodiments. Flowchart 1000 may refer to features of FIGS. 1-9 for illustrative purposes. Flowchart 1000, however, is not limited to the features disclosed by FIGS. 1-9.

In some instances, the disclosed embodiments may involve a customer who names a specific paper for a print job. Details of the customer's print job require color resources that are not available in paper catalog 124, as shown by paper catalog map 514. For example, a paper type may include two print conditions, such as default and high impact print conditions. The calibration data or the ICC profiles for the default print condition are available but the ones for the high impact print condition are not available. Referring to FIG. 7, paper type identification 702 includes print conditions 706 and 708. Print condition 708 may show in paper catalog map 514 that calibration data 7082A and 7084A or ICC profiles 7082B and 7084B are not available while calibration data 7062A and 7064A and ICC profiles 7062B and 7064B are available for print condition 706.

Thus, paper catalog map 514 provides in-depth, detailed information on color resources availability for each paper entry in paper catalog 124. This information is useful in providing immediate knowledge for the work involved before quoting a price or cost to the customer. If a certain paper type's prepare calibrations and ICC profiles do not cover a particular "print condition," such as ink saving mode, then the job price and turnaround time could involve extra work or time to do the particular calibration and ICC profile. The print shop can relay the information from paper catalog map 514 and provide realistic expectation and time budget to prepare the color resources that are missing for the customer.

Another way of showing these embodiments may be through the following example. A picky customer may request both "default" and "high impact" print conditions for a paper type of Kodak IJ Pro. The print shop of system 100 should quote a preparation cost and schedule. Thus, one may locate the paper type identification for Kodak IJ Pro in paper catalog map 514. Referring back to FIG. 8, Kodak IJ Pro may correspond to paper type identification 803 of paper group 802. Using the print condition and halftone representations shown in FIGS. 6 and 7, paper type identification 803 may indicate that the paper type has only color resources set up for the default print condition. So work needs to be done to collect calibration data and create ICC profiles for both halftones for the high impact print condition. The print shop may budget this extra work and provide a quote to the demanding customer. Further, this set of data and resources will be new additions to paper catalog 124 and updated in paper catalog map 514 to indicate that the calibration data and ICC profiles are readily available.

Step 1002 executes by defining a plurality of paper groups within paper catalog map 514 of paper catalog 124. Within one paper group of the plurality of paper groups, one or more paper types may be available for color printing operations. The one or more paper types include graphical representations to indicate whether the corresponding color printing resources are available. Step 1004 executes by identifying a paper type in the paper group for color printing operations. As disclosed above, a customer may select the paper type to complete a print job. Referring to FIG. 7, paper type identification 702 may be selected.

Step 1006 executes by identifying print conditions 706 and 708 associated with paper type identification 702. Print condition 706 may be a "default" print condition while print condition 708 may be a "high quality" print condition. Each print condition includes halftones, as disclosed above. Step 1008 executes by determining a first print condition, or print condition 706, includes halftones 7062 and 7064 that include corresponding calibration data and ICC profiles. As may be shown in paper catalog map 514, calibration data 7062A and 7064A are "filled" or measured within the print shop for system 100. ICC profiles 7062B and 7064B also are generated for halftones 7062 and 7064, respectively.

Step 1010 executes by determining a second print condition, or print condition 708, includes halftones 7082 and 7084. The disclosed embodiments, using paper catalog map 514 and paper catalog 124, indicate that one or more of the color printing resources for print condition 708 is not available. (Please ignore the marking shown in FIG. 7 for print condition 708 in this example) Thus, calibration data 7082A or 7084A is not measured within the print shop, and possibly borrowed from another paper type. Further, ICC profile 7082B or 7084B is not available either. For this example, the color printing resources for both halftones 7082 and 7084 are not measured or generated within the print shop.

Step 1012 executes by displaying paper type identification 702, print conditions 706 and 708 as well as their corresponding halftones and available color printing resources in paper catalog map 514. Step 1014 executes by determining operations needed to generate the calibration data and to create the ICC profiles for print condition 708. As disclosed above, calibration operations and ICC profile generation software/resources will be needed to provide the color printing resources within the print shop, specifically for printing device 104. Thus, the disclosed embodiments may determine what calibration data needs to be captured using calibration sheets and measurements. They also can determine what ICC profiles need to be generated using the processes disclosed above.

Step 1016 executes by determining a cost and a period of time to perform these operations within the print shop. Printing device 104 as well as computing resources will need to be diverted to capture data and generate the ICC profiles. The cost may include personnel time and labor as well as down time that halt printing operations while the calibration measurements are being performed. These activities also take time, such as a few hours or possibly a week, depending on when the proper equipment can be made available. The disclosed embodiments may determine this cost and delay to generate the calibration data and ICC profiles needed for print condition 708.

Step 1018 executes by determining an overall cost and period of time to complete a print job using paper type 702. The term "overall cost" may refer to the costs and time to complete the print job using print condition 706, having measured data immediately available for quality color printing. These estimates should be lower than using print condition 708, which requires manpower and time to use. Thus, the customer may compare costs and time to complete the print job using the different conditions. If a default condition as print condition 706 is lower and readily available, then the customer may select this print condition over the high quality print condition as print condition 708.

Figure 11:
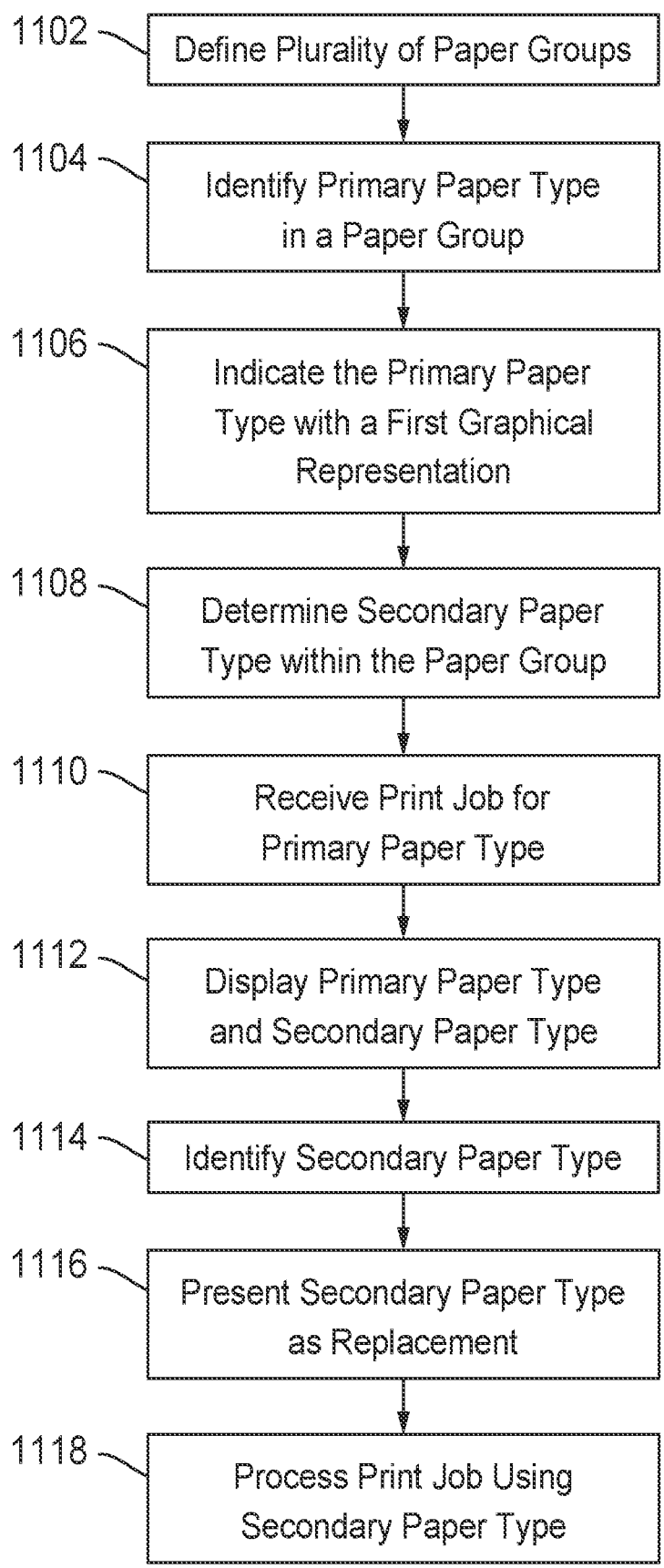
FIG. 11 illustrates a flowchart for using the paper catalog map of the paper catalog to determine a paper type replacement according to the disclosed embodiments.

FIG. 11 depicts a flowchart 1100 for using paper catalog map 514 of paper catalog 124 to determine a paper type replacement according to the disclosed embodiments. Flowchart 1100 may refer to features of FIGS. 1-10 for illustrative purposes. Flowchart 1100, however, is not limited to the features disclosed by FIGS. 1-10.

In some instances, the disclosed embodiments may include a situation where a customer has low demands for color accuracy. The customer has a specific paper in mind but is concerned once the print shop quotes the price for the job. For the print shop, it will be advantageous to retain this customer's interest by quoting a similar but cheaper paper type for the print job. For two "similar" papers, in this context, they will have many similar physical attributes. These attributes include finish (glossy or matte), weight, and whiteness. According to the disclosed embodiments, similar papers will end up in the same paper group. Paper catalog map 514 can readily present options within each paper group for the print shop to make a second, or cheaper, quote to the customer. It should be noted that a similar paper in the paper group will not be guaranteed as being a measured paper, thus resulting in a compromise in color quality for the print job.

Thus, paper catalog map 514 in conjunction with paper map 124 may present readily available price or quality compromise at different tiers. For a not-so-demanding customer, the highest tier would involve a primary paper type. At the same time, a lower-priced paper in the same paper group can be readily presented as an option. Paper catalog map 514, therefore, may readily present options for the print shop to make quotes, with compromises in quality and advantages in price visible.

In an example, the not-so-demanding customer may consider "IGEPA Inkjet Glossy" paper to cost too much. The print shop may wish to suggest an alternate paper type to offer for a quick turnaround job. The paper type is located on paper catalog map 514. Highlighting the paper group having the paper type, the disclosed embodiments show that the paper type "Bargain Jet" borrows color resources but does share certain attributes with the basis or primary paper type of IGEPA Inkjet Glossy within the paper group. The print shop may offer Bargain Jet paper type is a lower cost alternative to IGEPA Inkjet Glossy for the non-demanding customer. No preparation work is needed, such as capturing calibration data or generating ICC profiles, to use the Bargain Jet paper type in this instance.

Step 1102 executes by defining a plurality of paper groups within paper catalog map 514 of paper catalog 124, as disclosed by step 1002 in flowchart 1000. Step 1104 executes by identifying a primary paper type within a paper group of the plurality of paper groups. The identified primary paper type may be selected by a customer. Referring to FIG. 7, paper group 700 include paper type identification 702, which is the primary paper type of the paper group. Paper type identification 702 is a measured paper.

Step 1106 executes by indicating the primary paper type with a first graphical representation within paper catalog map 514. The first graphical representation includes color printing resources to color print using the primary paper type. Referring to FIG. 7, paper type identification 702 includes graphical representations for calibration data and ICC profiles in print conditions 706 and 708. As disclosed above, the graphical representation may indicate that these resources are "filled" or have been generated within the print shop. Further, the filled graphic indicates that paper type identification 702 is a measured paper.

Step 1108 executes by determining a secondary paper type within the paper group with a second graphical representation within paper catalog map 514 that indicates the color printing resources of the primary paper type are used to color print using the secondary paper type. Referring to FIG. 7, paper type identification 710 also is in paper group 700. Paper type identification 710 includes print condition 712, which includes graphical representations for calibration data and ICC profiles that indicates these resources are not measured. In other words, the graphical representations are not "filled." Further, paper catalog map 514 indicates that print condition 712 borrows color printing resources from print condition 708 of paper type identification 702 using connections 720 and 722. Thus, calibration data 7122A and 7124A of print condition 712 may borrow the resources of calibration data 7082A and 7084A of print condition 708 to perform color printing operations. ICC profiles 7122B and 7124B of print condition 712 may borrow the resources of ICC profiles 7082B and 7084B of print condition 708. Use of paper type identification 710, however, may result in less accurate or lower quality color printing as the borrowed resources were not captured or generated using measured data from the secondary paper type.

Step 1110 executes by receiving a print job from the customer for the primary paper type, or paper type identification 702 of paper group 700. Step 1112 executes by displaying the paper group with the primary paper type and the secondary paper type. Thus, paper type identification 702 is displayed with paper type identification 710. Further, the relationships between print condition 708 and 712 also are displayed. Step 1114 executes by identifying, using paper catalog map 514, that the secondary paper type is similar and corresponds in some fashion to the primary paper type.

Step 1116 executes by presenting the secondary paper type of a replacement for the primary paper type. This may be done using paper catalog map 514. Thus, the print shop may be presented with the option of substituting paper type identification 710 for paper type identification 702 to meet the needs of a not-so-demanding, or cheap, customer. The customer also may not care so much about color printing accuracy or quality and prefers a lower cost. Step 1118 executes by processing the print job using the secondary paper type. Printing device 104 may complete color image conversion and processing using the color printing resources provided for paper type identification 710, as borrowed from paper type identification 702, to print on the secondary paper type.

Figure 12:
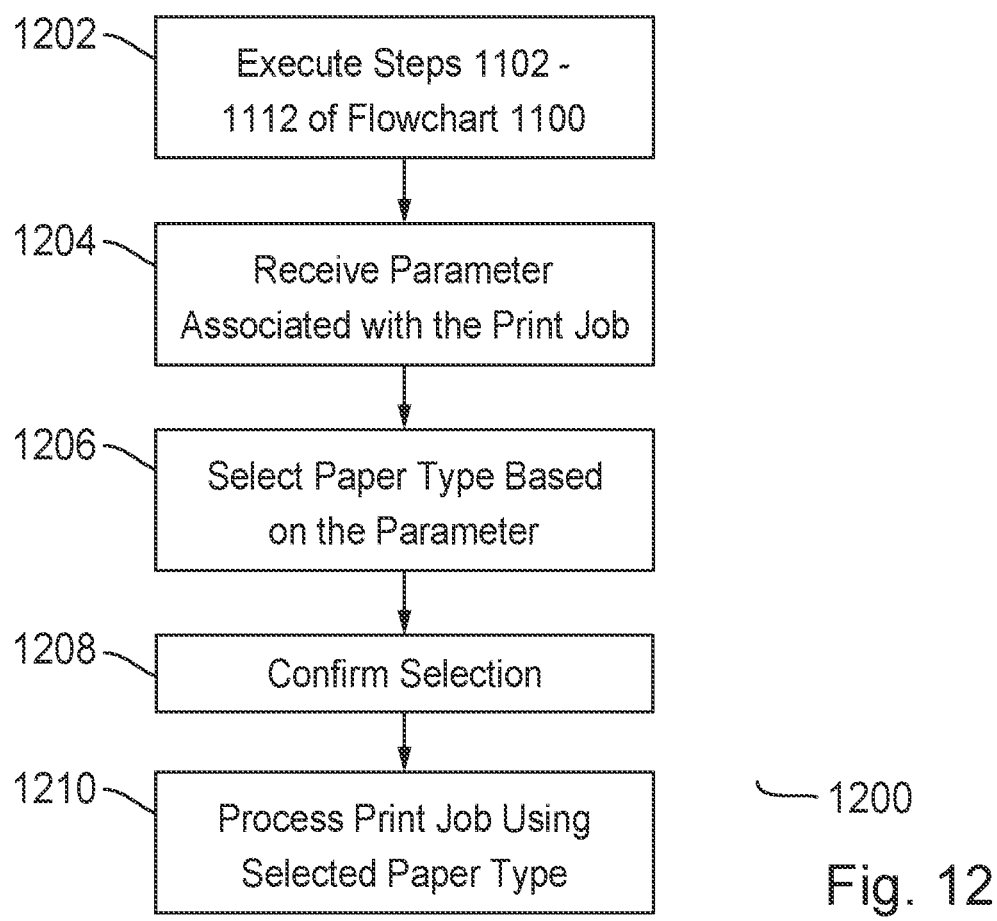
FIG. 12 illustrates a flowchart for using the paper catalog map of the paper catalog to determine a paper type according to a parameter according to the disclosed embodiments.

FIG. 12 depicts a flowchart 1200 for using paper catalog map 514 of paper catalog 124 to determine a paper type according to a parameter according to the disclosed embodiments. Flowchart 1200 may refer to features of FIGS. 1-11 for illustrative purposes. Flowchart 1200, however, is not limited to the features disclosed by FIGS. 1-11.

Step 1202 executes by executing steps 1102 to 1112 of flowchart 1100, as disclosed above. Thus, a primary paper type and a secondary paper type should be identified and made available to a customer or the print shop to select to process the received print job.

Step 1204 executes by receiving a parameter associated with the print job. The parameter may be an important factor in completing the print job, such as high quality or low cost. For example, the customer may be presented with several options for processing the print job, such as accurate color reproduction, glossy finish, heavy paper, bargain cost, and the like. As disclosed above, different paper types may have different results for these parameters, whether it be quality of the finished print job or a low cost.

In other embodiments, the parameter may relate to a print condition available for the specific paper type. For example, the parameter may specify the use of measured paper types, as disclosed above. Further, the parameter may request only default print conditions or ink saving mode print conditions. Paper catalog map 514 may allow the parameter to be used to search paper catalog 124 and return results within the map to show the paper types that match the parameter.

Step 1206 executes by selecting the paper type based on the parameter. For example, the primary paper type and the secondary paper type may be made available for selection. If the parameter relates to lower costs for the print job, then the secondary paper type may be selected as it may borrow color printing resources and not emphasize quality. Alternatively, if high quality or color reproduction accuracy is the parameter, then the primary paper type may be selected because, presumably, this paper type is a measured paper.

Step 1208 executes by confirming the paper type selection. Before proceeding to print using the selected paper type, the disclosed embodiments may want to make sure that the customer or print shop confirms the selection. It also gives an opportunity to override the selection or provide a new parameter if the selected paper type is not desired. Step 1210 executes by processing the print job using the selected paper type, as disclosed in step 1118 of flowchart 1100.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for using a paper catalog for color printing operations, the method comprising:

defining a plurality of paper groups within a paper catalog map of the paper catalog used for color printing operations, wherein a paper group of the plurality of paper groups includes a paper type;

identifying a plurality of print conditions associated with the paper type, wherein each of the plurality of print conditions relates to a desired result for the color printing operations;

determining a first print condition of the plurality of print conditions includes at least one halftone with corresponding calibration data and an ICC profile used for the color printing operations to enable the first print condition;

determining a second print condition of the plurality of print conditions includes at least one halftone without corresponding calibration data or an ICC profile such that the second print condition is not enabled;

displaying the paper type, the first print condition, and the second print condition in the paper catalog map;

determining operations needed to generate the calibration data and to create the ICC profile to enable the second print condition; and determining a cost and a period of time to generate the calibration data and to create the ICC profile to enable the second print condition based on the operations.

2. The method of claim 1, further comprising receiving a print job for the paper type.

3. The method of claim 2, further comprising determining an overall cost and an overall period of time to complete the print job.

4. The method of claim 3, wherein determining the overall cost and the overall period of time to complete the print job includes determining a cost to apply the first print condition.

5. The method of claim 4, wherein determining the overall cost and the overall period of time include the determined cost and the determined period of time to generate the calibration data and to create the ICC profile.

6. The method of claim 1, wherein the resources needed to generate the calibration data and to create the ICC profile for the second print condition are based on the calibration data and the ICC profile for the first print condition.

7. The method of claim 1, wherein the at least one halftone includes a detailed halftone or a smoothness halftone.

8. A method for using a paper catalog for color printing operations, the method comprising:

defining a plurality of paper groups within a paper catalog map of the paper catalog used for color printing operations, wherein a paper group of the plurality of paper groups includes a primary paper type;

identifying a first print condition associated with the primary paper type;

indicating the primary paper type with a first graphical representation within the paper catalog map, wherein the first graphical representation includes color printing resources needed to color print to enable the first print condition when printing using the primary paper type;

determining a secondary paper type within the paper group with a second graphical representation within the paper catalog map that indicates the color printing resources of the primary paper type are used to color print to enable the first print condition when printing using the secondary paper type;

receiving a print job for the primary paper type; and presenting the secondary paper type as a replacement for the primary paper type using the paper catalog map.

9. The method of claim 8, wherein the color resources include calibration data and an ICC profile to color print using the primary paper type.

10. The method of claim 8, further comprising locating the primary paper type within the paper catalog map.

11. The method of claim 8, further comprising displaying the first graphical representation for the primary paper type and the second graphical representation for the secondary paper type within the paper catalog map.

12. A method for using a paper catalog for color printing operations at a printing device, the method comprising:

defining a plurality of paper groups within a paper catalog map used for color printing operations, wherein each paper group includes a primary paper type within its own graphical representation within the paper catalog map;

identifying a first print condition for the primary paper type;

indicating each primary paper type within its respective graphical representation with a measured paper type identification to indicate calibration data and an ICC profile generated using measurements obtained from the primary paper type, wherein the calibration data and the ICC profile are used to enable the first print condition for the color printing operations;

identifying a second print condition for a secondary paper type;

indicating the secondary paper type along with the primary paper type in the respective paper group with an unmeasured paper type identification to indicate the calibration data and the ICC profile are borrowed from the primary paper type to enable the second print condition for color printing operations; and selecting the primary paper type of one of the plurality of paper groups or the secondary paper type of one of the plurality of paper groups for a print job according to a parameter associated with the print job.

13. The method of claim 12, further comprising assigning the calibration data and the ICC profile of the primary paper type from the first print condition to the second print condition of the secondary paper type.

14. The method of claim 12, wherein the first print condition includes at least one halftone corresponding to the calibration data and the ICC profile.

15. The method of claim 12, wherein the selecting step includes selecting the primary paper type over the secondary paper type if the parameter relates to the first print condition.

16. The method of claim 12, wherein the selecting step includes selecting the secondary paper type over the primary paper type if the parameter relates to the second print condition.

17. The method of claim 12, further comprising printing the print job by applying the calibration data or the ICC profile of the selected primary paper type or secondary paper type.

* * * * *